(12) United States Patent
Nagasawa et al.

(10) Patent No.: US 7,429,009 B2
(45) Date of Patent: Sep. 30, 2008

(54) PROCESS FOR PRODUCTION OF WATER-ABSORBING MATERIAL

(75) Inventors: Makoto Nagasawa, Himeji (JP); Shinichi Fujino, Himeji (JP); Yorimichi Dairoku, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 584 days.

(21) Appl. No.: 10/858,269

(22) Filed: Jun. 2, 2004

(65) Prior Publication Data

US 2004/0249120 A1      Dec. 9, 2004

(30) Foreign Application Priority Data

Jun. 3, 2003    (JP)    ............... 2003-158044

(51) Int. Cl.
B02C 19/00    (2006.01)
B09B 3/00     (2006.01)
B22F 9/04     (2006.01)

(52) U.S. Cl. ................... 241/3; 241/21; 241/23

(58) Field of Classification Search ............. 241/3, 241/21, 23

See application file for complete search history.

(56) References Cited

U.S. PATENT DOCUMENTS 3,935,099 A    1/1976    Weaver et al.

(Continued)

FOREIGN PATENT DOCUMENTS

| | | |
|---|---|---|
| DE | 695 34 703 | 8/2006 |
| EP | 0 309 187 A2 | 3/1989 |
| EP | 0 668 080 A2 | 8/1995 |
| EP | 0 689 817 A2 | 1/1996 |
| EP | 0 789 047 | 8/1997 |
| EP | 0 844 270 A1 | 5/1998 |
| EP | 0844270 | 5/1998 |

(Continued)

*Primary Examiner*—Bena Miller
(74) *Attorney, Agent, or Firm*—Roylance, Abrams, Berdo & Goodman, L.L.P.

(57) ABSTRACT

An object of the present invention is to make it possible, in order to form the fine powder of the water-absorbent resin into a water-absorbing material having particle diameters favorable for practical use, that a water-absorbing material which has high agglomeration strength and is excellent in the quality performances is obtained at a low cost with good efficiency without causing the problems of the adhesion to such as treatment apparatus. As a means of achieving this object, a process according to the present invention for production of a water-absorbing material is a process for production of a water-absorbing material from a fine powder of a water-absorbent resin wherein the water-absorbing material is a particulate water-absorbing material having particle diameters larger than the fine powder, with the process comprising: a step (a) of adding an aqueous liquid to the fine powder of the water-absorbent resin with such as a high-speed stirring type continuous extrusion mixer 50 so that the overall average water content will be in the range of 20 to 60 weight %, whereby particles of the fine powder are agglomerated to thus obtain a particulate hydrous material 70 of the water-absorbent resin; and a step (b) of applying a mechanical compression force to the particulate hydrous material 70 and, at the same time, knead-pulverizing it, with such as a meat chopper apparatus 30, thereby obtaining particulate agglomerates 40 of the water-absorbing material.

22 Claims, 2 Drawing Sheets

U.S. PATENT DOCUMENTS

| | | |
|---|---|---|
| 3,959,569 A | 5/1976 | Burkholder, Jr. |
| 4,625,001 A | 11/1986 | Tsubakimoto et al. |
| 4,654,039 A | 3/1987 | Brandt et al. |
| 4,690,996 A | 9/1987 | Shih et al. |
| 4,721,647 A | 1/1988 | Nakanishi et al. |
| 4,738,867 A | 4/1988 | Itoh et al. |
| 4,748,076 A | 5/1988 | Saotome |
| 4,769,427 A | 9/1988 | Nowakowsky et al. |
| 4,826,880 A | 5/1989 | Lesniak et al. |
| 4,950,692 A | 8/1990 | Lewis et al. |
| 5,064,582 A | 11/1991 | Sutton et al. |
| 5,250,640 A | 10/1993 | Irie et al. |
| 5,275,773 A | 1/1994 | Irie et al. |
| 5,350,799 A | 9/1994 | Woodrum et al. |
| 5,478,879 A | 12/1995 | Kajikawa et al. |
| 5,720,736 A | 2/1998 | Hatsuda et al. |
| 5,733,576 A | 3/1998 | Chmelir |
| 2001/0003358 A1 * | 6/2001 | Terase et al. .................. 252/62 |
| 2007/0238806 A1 * | 10/2007 | Mitsukami et al. .......... 522/150 |

FOREIGN PATENT DOCUMENTS

| | | |
|---|---|---|
| EP | 0 882 502 A1 | 12/1998 |
| JP | 6-312000 | 11/1994 |
| JP | 10-113557 | 5/1998 |
| JP | 2000-189794 | 7/2000 |
| JP | 2001-79829 | 3/2001 |
| JP | 2001-192464 | 7/2001 |
| WO | WO 99/47184 | 9/1999 |

* cited by examiner

PROCESS FOR PRODUCTION OF WATER-ABSORBING MATERIAL

BACKGROUND OF THE INVENTION

A. Technical Field

The present invention relates to a water-absorbent resin which is, for example, used favorably for sanitary materials (e.g. disposable diapers, sanitary napkins, so-called incontinent pads). More specifically, the present invention relates to a process in which a fine powdery water-absorbent resin, which is difficult to use if it is left as it is, is utilized to efficiently produce a particulate agglomerate or particulate water-absorbing material that is appropriate for the use.

B. Background Art

The fine powdery water-absorbent resin is generated in a process for production of a water-absorbent resin. For example, when a blocky or sheet, water-absorbent resin is pulverized to produce a water-absorbent resin product, particles having become finer than the desired particle diameter range are generated. Besides, in a process for production of a water-absorbent resin product, there is a case where a fine powder, which is inappropriate as a product, is generated due to such as collision of particles with each other or with apparatus. In addition, in the case of the reversed-phase suspension polymerization, a fine powder not larger than a definite particle diameter is formed as a by-product during the polymerization.

Arts by agglomeration are proposed as arts for recovering such a fine powder of a water-absorbent resin to recycle it. As to a binder for the water-absorbent resin during the agglomeration, generally, water or an aqueous liquid is favorable from the viewpoint of such as efficiency, safety, and production costs. Thus, also in nearly all the above methods, the aqueous liquid which plays a role like the binder is added to the fine powder.

However, a water-absorbent resin, particularly a fine powdery one, has a large surface area and is therefore so fast in absorption rate that it is difficult to uniformly add the aqueous liquid thereto. In addition, the use of such as insoluble inorganic powder as a mixing assistant for the aqueous liquid, generally, has not only problems of costs, but also problems of dust generation and deterioration of agglomeration strength and other physical properties.

Patent document 1 below discloses a method including the steps of: spraying a fine powder of a water-absorbent resin with water or an aqueous solution of a water-soluble polymer to thereby wet the surfaces of the fine powder of the water-absorbent resin; and then compression-molding it into a sheet shape; and then pulverizing the resultant molding to thereby obtain an agglomerate material.

Patent document 2 below discloses a method including the steps of: mixing a fine powder of a water-absorbent resin with water (deionized water) to thereby wet the fine powder of the water-absorbent resin to thus obtain an amorphous or homogeneous gel having a water content (ratio of water to the total weight of the water-absorbent resin and water) of 62 to 80%; and then cutting and drying the gel to thereby obtain an agglomerate material. Furthermore, patent documents 3 and 4 below discloses a method including the steps of: stir-mixing a fine powder of a water-absorbent resin with water or a physiological saline solution to thereby form viscous agglomerates having a water content of 67%; and then forming them into a sheet by low-temperature extrusion coating or spreading. In addition, patent document 5 below discloses a method including the steps of: using a small-sized turbilizer to add inorganic fine particles to a fine powder of a water-absorbent resin and further an aqueous solution of a crosslinking agent to this fine powder, thereby obtaining a hydrous material of a water-absorbent resin having a water content of 17%; and then further applying mechanical compression to this hydrous material to process it into a sheet shape; and then drying and pulverizing the resultant sheet to thereby obtain an agglomerate material.

[Patent Document 1]
   JP-A-113557/1998 (Kokai)
[Patent Document 2]
   U.S. Pat. No. 4,950,692
[Patent Document 3]
   U.S. Pat. No. 4,826,880
[Patent Document 4]
   EP 0309187
[Patent Document 5]
   EP 0844270 (Kokai)

However, even if the above prior art methods are used to carry out the agglomeration of the fine powders, there are problems that the operation of finely cutting the hydrous material of the water-absorbent resin or pulverizing it is difficult, and also there are problems that, in the case where the hydrous material of the water-absorbent resin in a high-water-content state is obtained, its drying takes high energy costs, and further there are problems of the thermal deterioration of the water-absorbent resin during the drying. In other words, in the case where the agglomeration strength of the fine powder is enhanced, water needs to be used in a large amount, so there are problems of the increase of costs and the thermal deterioration in addition to the workability deterioration. Hereinafter, further problems are described.

A water-absorbent resin has a property for surfaces of its particles to come to have the tackiness if it absorbs water. This tackiness depends on the water content of surfaces of the water-absorbent resin powder, and strong tackiness occurs in a certain water content range. The water content (ratio of water to the total weight of the water-absorbent resin and water) in this range where the tackiness is strong is in the range of 20 to 50 weight %. Above all, near 30 weight %, very strong tackiness occurs. This tackiness enables the agglomeration of particles of the fine powder.

As to the prior art methods, in nearly all cases, in order to make the water content of the hydrous material of the fine powder of the water-absorbent resin uniform, time is spent in mixing the fine powder of the water-absorbent resin with water, or the resultant hydrous material of the water-absorbent resin is left static for a definite time, thereby making the water content uniform. Examples of the shape of the above-shown hydrous material of the water-absorbent resin include a sheet shape and a particulate shape.

However, in the case where the surfaces of the hydrous material of the water-absorbent resin, which has been formed as a result of the agglomeration and integration of the fine powder and of which the water content has become uniform, have the water content in the range where the tackiness is strong, it follows that these surfaces exhibit the strong tackiness. Therefore, in the process in which a particulate agglomerate water-absorbing material is produced by subjecting the hydrous material of the water-absorbent resin to the steps such as of conveyance, fine cutting, and pulverization, a part of the hydrous material of the water-absorbent resin adheres to such as inner surfaces of treatment apparatus and thus can cause the poor operation of the treatment apparatus (e.g. increase of the load in operation of the apparatus, stop of the apparatus due to the overload). In particular, as the hydrous material of the water-absorbent resin adheres increasingly to such as inner surfaces and stirring-blades of mixers, cutting blades of fine cutters, and extrusion perforations of extruders to thus lead to the increasing growth (accumulation) of its adhered material, the efficiency of the fine cutting decreases, and the resistance during the extrusion increases, so that the treatment efficiency unfavorably decreases much.

On the other hand, in the case where the water content of the hydrous material of the water-absorbent resin is beforehand increased to not lower than 50 weight %, favorably not lower than 60 weight %, in order to enhance the treatment efficiency, the surface tackiness of this hydrous material may decrease. However, the decrease of the surface adhesive strength means that the binding between fine powder particles becomes weak. In other words, the deterioration of the shape-retaining ability and of the strength as to the formed hydrous material of the water-absorbent resin is caused, so that the handling rather becomes difficult.

Furthermore, because the final water-absorbent resin product is often supplied in a dry state, the contained water must be removed. Therefore, the hydrous material of the water-absorbent resin having been obtained in a high-water-content state takes a great deal of labor and time to remove water from. In other words, because the energy costs needed for the heat-drying increases unfavorably, the above is a method difficult to consider from the establishment of an efficient production process as originally aimed at. In addition, there has also been a case where the long-time drying causes the thermal deterioration of the water-absorbent resin. Thus, a method has also been proposed in which: in order to simplify particularly the drying, the amount of water being used is reduced to thus agglomerate the fine powder under conditions where the water content is in the range of several weight % to ten and several weight %. However, in the case where the water content is low, this method has had problems that the agglomeration strength is very weak.

Furthermore, it is also possible to consider carrying out the operations such as of fine-cutting and pulverization after having sufficiently dried the resultant the hydrous material of the water-absorbent resin to thereby get rid of the surface tackiness. However, depending on the agglomeration strength of the fine powder (binding force between fine powder particles), if the above operations are carried out after the drying has been completely made, then a fine powder unfavorably tends to newly be generated when the fine-cutting or pulverization is carried out.

SUMMARY OF THE INVENTION

A. Object of the Invention

An object of the present invention is to make it possible, in order to form the fine powder of the water-absorbent resin into a water-absorbing material having particle diameters favorable for practical use, that a water-absorbing material which has high agglomeration strength and is excellent in the quality performances is obtained at a low cost with good efficiency without causing the problems of the adhesion to such as treatment apparatus.

B. Disclosure of the Invention

The present inventors diligently studied with consideration given to the above prior problems. As a result, the present inventors have completed the present invention (processes 1 and 2 below) by finding out agglomeration processes which solve the aforementioned various problems caused by the fine powder of the water-absorbent resin, and have high agglomeration ability, and further give a solid component content in the range which has hitherto been difficult to achieve.

That is to say, a process (process 1) according to the present invention for production of a water-absorbing material is a process for production of a water-absorbing material from a fine powder of a water-absorbent resin wherein the water-absorbing material is a particulate water-absorbing material having particle diameters larger than the fine powder, with the process comprising: a step (a) of adding an aqueous liquid to the fine powder of the water-absorbent resin so that the overall average water content will be in the range of 20 to 60 weight %, whereby particles of the fine powder are agglomerated to thus obtain a particulate hydrous material of the water-absorbent resin; and a step (b) of applying a mechanical compression force to the particulate hydrous material and, at the same time, pulverizing it, thereby obtaining particulate agglomerates of the water-absorbing material.

In addition, another process (process 2) according to the present invention for production of a water-absorbing material is a process for production of a water-absorbing material from a fine powder of a water-absorbent resin wherein the water-absorbing material is a particulate water-absorbing material having particle diameters larger than the fine powder, with the process comprising: a step (a) of adding an aqueous liquid to the fine powder of the water-absorbent resin so that the overall average water content will be in the range of 20 to 60 weight %, whereby particles of the fine powder are agglomerated to thus obtain a sheet hydrous material of the water-absorbent resin constituted by at least two layers having different water contents; and a step (b) of applying a mechanical compression force to the hydrous material and, at the same time, pulverizing it, thereby obtaining particulate agglomerates of the water-absorbing material.

[Fine Powder of Water-Absorbent Resin]:

The water-absorbent resin, which is used as the starting material, refers to a water-swellable and water-insoluble crosslinked polymer. Specific examples thereof include: polyacrylic resins; graft copolymers of starch-acrylic acid; copolymers of isobutylene-maleic anhydride; and crosslinked poly(alkylene oxides). In addition, in the present invention, the water-absorbing material refers to a gelling material for absorption of aqueous liquids wherein the gelling material contains the water-absorbent resin as the main component, favorably in an amount of 80 to 100 weight %, of the solid components. Particularly in the present invention, the water-absorbing material is a molding or agglomerated product from the fine powder of the water-absorbent resin used as the starting material.

Incidentally, the aqueous liquid is free of especial limitation if it includes water. The aqueous liquid may further include an organic solvent, or may be free of solvent, or may further include a solute. However, favorably, the aqueous liquid is urine, particularly, human urine.

The above water-absorbent resin may be either a water-absorbent resin as newly produced by polymerizing a monomer, or a fine powder as generated when the already used water-absorbent resin product is recycled. A fine powder with predetermined particle diameters can be obtained by classifying the water-absorbent resin with a conventional sieve apparatus after having pulverized the water-absorbent resin to form it into a powder. As the water-absorbent resin being sieve-classified, there can be used either the below-mentioned resin having been surface-crosslinked, or a water-absorbent resin which has not been surface-crosslinked yet.

The particle diameters of the fine powder can be changed according also to the purpose for which the water-absorbing material is used or to the performance which is demanded to the water-absorbing material. Usually, a fine powder having particle diameters smaller than 300 μm is used, and its weight-average particle diameter is favorably in the range of 150 to 10 μm, more favorably 130 to 20 μm, particularly favorably 120 to 40 μm. The shape of the fine powder is different according to such as its production process or hysteresis after the production. Examples thereof include: a common spherical shape; and besides, a shape having unevenness or warps partly in the spherical shape; an irregularly pulverized shape; a scaly shape; and a fibrous shape.

[Hydrous Material of Water-Absorbent Resin (Process 1, Process 2)]:

The hydrous material of the water-absorbent resin is a material formed by integrating the fine powder of the water-absorbent resin in a water-containing state to thus unite it into a predetermined shape. In the present invention, the water content of the hydrous material of the water-absorbent resin needs to be in the range of 20 to 60 weight %, and the shape of this hydrous material is particulate (process 1) or sheet (process 2).

In the case where the hydrous material of the water-absorbent resin is the sheet hydrous material (process 2), the water content may be lower in the central side than in the surface sides or may be higher in the central side than in the surface sides. The water content may become lower from the surface sides toward the central side either continuously or stepwise. The water content may become higher from the surface sides toward the central side either continuously or stepwise. In addition, in the case of the particulate hydrous material, the water content may be uniform. However, favorably, similarly to the aforementioned sheet hydrous material, the particulate hydrous material has a water content gradient. Specifically, particularly in the case of the sheet hydrous material of the water-absorbent resin, this hydrous material needs to have water contents such that the water contents in the surfaces are different from that in the inside. In addition, it is favorable that the particulate hydrous material (process 1) also has different water contents in an identical particle.

If the fine powder of the water-absorbent resin is merely integrated with no addition of water or with addition of only a small amount of water, then this fine powder neither becomes united nor sufficiently exhibits the shape-retaining ability. If the specific amount of water is made contained, then fine powder particles become bound together to thus become united. Accordingly, it is desirable that even the central portion having the lowest water content should be allowed to contain not less than a minimum of water needed for the unification. As the water content becomes higher, namely, increasingly exceeds 50 weight %, favorably 60 weight %, the tackiness or adhesion of the surfaces becomes less. However, if the water content becomes too high, the operation of finally removing the contained water takes labor, and further, the binding force between fine powder particles becomes weak, so that the shape-retaining ability of the hydrous material and its unity are also deteriorated.

In the hydrous material of the water-absorbent resin, the water content of the higher-water-content portion can be set in the range of 50 to 99 weight %, favorably 60 to 99 weight %, and the water content of the lower-water-content portion can be set in the range of 1 to 50 weight % (but not including 50 weight %), favorably 1 to 40 weight %.

How much weight ratio to the entirety of the hydrous material of the water-absorbent resin is accounted for by each of the above higher-water-content portion and lower-water-content portion is not especially limited. However, it is arranged that, of these higher-water-content portion and lower-water-content portion, even whichever portion accounts for the lower ratio should account for at least 2 weight %. Between the higher-water-content portion and the lower-water-content portion, there may be interposed an intermediate-water-content portion having an intermediate water content. Or the water content may vary continuously from the higher-water-content portion toward the lower-water-content portion. The overall average water content of the hydrous material can be set in the range of 20 to 60 weight %, favorably 30 to 50 weight %. As is previously mentioned, when the hydrous material has an overall average water content near 30 weight %, the most adhesive strength occurs. Therefore, the overall average water content of the hydrous material is set more favorably in the range of 30 to 45 weight %, most favorably 30 to 40 weight %.

Water (aqueous liquid) to be supplied to the hydrous material can beforehand be mixed with a binder for increasing the binding force between fine powder particles. Examples of the binder include crosslinking agents and inorganic fine particles.

The crosslinking agents being used are crosslinking agents which have at least two functional groups reactable with a functional group (e.g. a carboxyl group) of the water-absorbent resin. Examples thereof include: polyhydric alcohols (e.g. glycerol, propylene glycol, ethylene glycol, 1,4-butanediol); polyglycidyl compounds (e.g. polyethylene glycol diglycidyl ether, glycerol diglycidyl ether, ethylene glycol diglycidyl ether); alkylene carbonates (e.g. ethylene carbonate); polyamine compounds (e.g. ethylenediamine); polyisocyanate compounds; and polyaziridine compounds.

Examples of the inorganic fine particles being used include: mica, pyrophyllite, kaolinite, hulsite, and other analogous clay minerals; and fine particulate silica, such as Aerosil 200 (produced by Nippon Aerosil Co., Ltd.) and CARPLEX (registered trademark) #80 (produced by Shionogi K. K.) (these mainly include silicon dioxide particles having a weight-average particle diameter of not larger than 50 μm).

As other aqueous liquids besides water (pure water), there can be used a hydrophilic organic solvent and an aqueous solution in which a water-soluble polymer compound is dissolved. Examples of the hydrophilic organic solvent include methanol, ethanol, ethylene glycol, propylene glycol, and glycerol. Examples of the water-soluble polymer compound include: natural polymers, such as starches (e.g. extractable starches, alpha-converted starches), cellulose derivatives (e.g. sodium carboxymethyl cellulose, hydroxyethyl cellulose), sodium alginate, gua gum, xanthan gum, gum arabic, carrageenin, mannan, gluten, and chitosan; and synthetic polymers, such as poly(vinyl alcohol), poly(ethylene oxide), polyethylene glycol, poly(sodium acrylate), and polyetherates.

In addition, as to the hydrous material of the water-absorbent resin in the present invention, its temperature is set in the range of 10 to 100° C., favorably 40 to 100° C., more favorably 50 to 100° C., particularly favorably 60 to 100° C. If the hydrous material of the water-absorbent resin is in a heated state, then the workability (such as of the below-mentioned pulverization step) is more enhanced, and further the drying duration in the below-mentioned drying step is also shortened.

Examples of means of putting the hydrous material of the water-absorbent resin in the heated state (e.g. 40 to 100° C.) include a method in which the fine water-absorbent resin powder and/or aqueous liquid is preheated before their mixing. For example, it is favorable that the fine water-absorbent resin powder and/or aqueous liquid is preheated in the range of 40 to 100° C., more favorably 50 to 100° C., particularly favorably 60 to 100° C., before their mixing.

[Sheet Hydrous Material of Water-Absorbent Resin (Process 2)]:

In this case, a variation of the water content needs to be provided in the thickness directions. Specifically, there can be adopted a form constituted by three layers such that the central range of the resultant sheet hydrous material of the water-absorbent resin is a lower-water-content layer, and that both the surface and the back are higher-water-content layers. In addition, there can also be adopted a form such that these sheet hydrous materials are laid on each other. There may exist one or more intermediate-water-content layers between the higher-water-content layer and the lower-water-content layer. Or the water content may vary continuously from the higher-water-content layer toward the lower-water-content layer. In short, at least two layers (ranges) different in water content exist in the resultant hydrous material of the water-absorbent resin to thus constitute this hydrous material of the water-absorbent resin.

The width of the sheet hydrous material of the water-absorbent resin can be set appropriately for the treatment amount. However, for example, this width can be set in the range of 1 to 250 cm, favorably 1 to 100 cm, more favorably 5 to 20 cm. The thickness of one layer in the sheet hydrous material of the water-absorbent resin can be set in the range of 0.5 to 5 mm, favorably 1 to 2 mm.

The length of the sheet hydrous material of the water-absorbent resin is not especially limited. The sheet hydrous material of the water-absorbent resin may be either in the shape of a lengthwise continuous belt or in the shape of a rectangle having a definite length.

[Production of Sheet Hydrous Material of Water-Absorbent Resin (Process 2)]:

The following process can be adopted as a process for production of the sheet hydrous material of the water-absorbent resin in the shape of the continuous belt.

The aqueous liquid is supplied onto the upside of a belt conveyor which rotates endlessly and has a belt of which the adhesion of the surface has been reduced with such as fluororesin. Then, the fine powder of the water-absorbent resin is supplied and thereby accumulated in layers onto the upside of the belt conveyor onto which the aqueous liquid has been supplied. Then, furthermore, the aqueous liquid is re-supplied onto the fine powder of the water-absorbent resin having been accumulated in layers.

The belt conveyor has a width corresponding to that of the sheet hydrous material and is run at a predetermined speed. The running speed can be set appropriately for the treatment amount. However, for example, this speed can be set in the range of 0.1 to 10 m/min.

The amount of the aqueous liquid being supplied in the initial step can be set appropriately for the treatment amount. For example, this amount can be set in the range of 20 to 8,700 g/min. The amount of the fine powder being supplied can also be set appropriately for the treatment amount. For example, this amount can be set in the range of 30 to 13,000 g/min. The amount of the aqueous liquid being supplied in the later step can also be set appropriately for the treatment amount. For example, this amount can be set in the range of 20 to 8,700 g/min.

If a definite time is maintained after the supply of the aqueous liquid in the later step has ended, then the resultant hydrous fine powder particles become bound to each other to thus unite, and further, there is constituted the aforementioned structure such that the higher-water-content layer and the lower-water-content layer are laid on each other. The maintenance time is in the range of 0.001 to 5 minutes, favorably 0.001 to 1 minute, more favorably 0.001 to 0.5 minute. In the case where the maintenance time is too long, the difference in water content between the surface side and the central side unfavorably becomes so small that the strong tackiness occurs to the surface side.

If the resultant belt-shaped hydrous material is cut every predetermined length, then the rectangular hydrous material can be obtained.

It is also possible to obtain the rectangular hydrous material by carrying out the supply of the aqueous liquid, the supply of the fine powder, and the supply of the aqueous liquid in sequence on a stand partitioned with a rectangular frame.

[Particulate Hydrous Material (Favorably, Reversed-Fisheye-Shaped Hydrous Material of Water-Absorbent Resin) (Process 1)]:

The particulate hydrous material having a water content of 20 to 60 weight %, which is used in the present invention, may have a uniform water content. However, favorably, similarly to the aforementioned sheet hydrous material, the particulate hydrous material is made to have a variation of the water content in an identical particle, wherein the variation of the water content is in the shape of a reversed fisheye.

The reversed fisheye, as hereupon referred to, is a state like a "fisheye phenomenon". Usually, when a powder of the water-absorbent resin is swollen with such as water, there is a case where the gel blocking by the swollen gel of the swollen water-absorbent resin causes a state where an unswollen (i.e. powdery) water-absorbent resin exists in the swollen gel. This state is called "fisheye". The "reversed fisheye" is its reverse state where the central portion of an aggregate of the agglomerated fine powder particles of the water-absorbent resin is in a swollen gel state and where the fine powder of the water-absorbent resin adheres to the surface of this agglomerate.

In this case, a variation of the water content is provided to the resultant agglomerate particle toward its center. Specifically, there can be adopted a form of an agglomerate particle formed by a higher-water-content layer in the central range of the agglomerate particle and a lower-water-content layer in the surface of the agglomerate particle. There may exist an intermediate-water-content layer between the lower-water-content layer and the higher-water-content layer. Or the water content may vary continuously from the lower-water-content layer toward the higher-water-content layer.

The particle diameters of the reversed-fisheye-shaped hydrous material of the water-absorbent resin can be set in the range of 0.2 to 100 mm, favorably 0.5 to 20 mm.

[Production of Reversed-Fisheye-Shaped Hydrous Material of Water-Absorbent Resin (Process 1)]:

The following process can be adopted as a process for production of the reversed-fisheye-shaped hydrous material of the water-absorbent resin in the form of the agglomerate particles.

For the production of the reversed-fisheye-shaped hydrous material of the water-absorbent resin, it is necessary to stir-mix the fine water-absorbent resin powder and the supplied aqueous liquid at a high speed for a short time. This time for which the mixing is carried out is desired to be within 1 minute, favorably within 30 seconds.

In the case where the mixing time is long, the water content of the resultant hydrous material of the water-absorbent resin unfavorably becomes uniform throughout the inside of the agglomerate particles after the absorption of the aqueous liquid by the fine powder, and then this hydrous material of the water-absorbent resin adheres to the inside of the mixer to thus become large lumps, so that the mixing becomes impossible.

The mixer is free of especial limitation if it is an apparatus with which the above momentary mixing can be carried out. However, container-fixed type mixers, above all, mechanical stirring type mixers, are favorable. Examples of such mixers include Super Turbo (produced by Nisshin K. K.), Turbilizer (produced by Hosokawa Mikron Co., Ltd.), and Lödige Mixer (produced by Gebrüder Lödige Maschinenbau GmbH). The mixer may be either a batch type mixer or a continuous type mixer. There may be a case where the batch type mixer is favorable in that the stable performance can be achieved.

Besides, as to the addition of the aqueous liquid, it is more desirable to add the aqueous liquid to the fine water-absorbent resin powder all at once. In the case where the aqueous liquid is gradually added by methods such as spraying, not only does the addition take long time, but also the fine water-absorbent resin powder and the aqueous liquid unfavorably become uniformly mixed together, so that the resultant hydrous material of the water-absorbent resin adheres to the inside of the mixer due to the tackiness of the hydrous material. The time for which the addition of the aqueous liquid is carried out is desired to be within 1 minute, favorably within 30 seconds.

After the mixing has ended, it is necessary to proceed to the next step soon. In the case where the time of until proceeding to the next step is too long, the absorbed aqueous liquid diffuses uniformly throughout the inside of the particles, with the result that the difference in water content between the surface side and central side of each agglomerate particle unfavorably becomes so small that the strong tackiness occurs to the surface side of each agglomerate particle. Accordingly, it is favorable to proceed to the next step within 0.001 to 5 minutes, more favorably within 0.001 to 1 minute, still more favorably within 0.001 to 0.5 minute, after the fine powder of the water-absorbent resin has come into contact with the aqueous liquid.

[Production of Particulate Agglomerates of Water-Absorbing Material (Process 1, Process 2)] . . . Step (b):

In the present invention, the particulate agglomerates of the water-absorbing material refer to finely granulated particles of the hydrous material of the water-absorbent resin (agglomerate hydrous particles of the water-absorbent resin) including the fine powder and the aqueous liquid.

The mechanical compression force is applied to the hydrous material and, at the same time, the hydrous material is pulverized, thereby obtaining the particulate agglomerates of the water-absorbing material. Incidentally, the mechanical compression will do if the hydrous material is thereby compressed. The mechanical compression can be confirmed, for example, from the deformation of the hydrous material or the increase of the bulk density of the hydrous material during the compression. As to the aforementioned sheet or particulate hydrous material, the mechanical compression force is further applied to it in a state where it has a water content gradient between its surface side and central side (there is a sufficient difference in water content therebetween), and, at the same time, the hydrous material is pulverized, thereby carrying out granulation (fine granulation). Favorably for uniform pulverization, the hydrous material to be pulverized is in the aforementioned heated state (favorably, 50 to 100° C.).

Hereupon, the granulation refers to an operation of applying the mechanical compression force to the belt-shaped (sheet), agglomerate-particle-shaped (favorably, reversed-fisheye-shaped), or other-shaped hydrous material of the water-absorbent resin and, at the same time, kneading it to thus immediately pulverize it (knead-pulverizing it), thereby making the water content gradient substantially uniform and even all at once and finally molding (finely granulating) the hydrous material into the particulate agglomerates having the desired size. Incidentally, the "making the water content gradient substantially uniform and even all at once" refers to bringing the hydrous material into a state where the formed layers having different water contents have disappeared by uniformly being mixed or kneaded. However, there may be a difference in water content particle by particle between microscopic fine particles.

Accordingly, the granulation is a technical conception including conventional granulation means, such as pulverization operation, fine cutting operation, cutting and shaving operation, and extrusion molding operation.

Basically, conventional techniques for production of particulate agglomerate water-absorbing materials are, in a batch manner or continuous manner, applicable to apparatuses or means for the granulation (apparatuses or means for application of the mechanical compression force). Specific usable examples thereof include: at least one member selected from the group consisting of such as meat chopper apparatuses; single-screw extruders (e.g. Dome Gran); twin-screw knead-extruders; kneaders, slitters, cutting apparatuses by scissors or cutters; and pulverizers. These extrusion knead-pulverizers are usually provided with one or more rotary shafts and a plurality of stirring-members around the one or more rotary shafts so as to thereby extrude the hydrous material. In addition, these extrusion knead-pulverizers can be provided with an apparatus for carrying out the heating or heat-retaining (e.g. jacket). Also from the viewpoint of physical properties, favorable ones are extrusion knead-pulverizers, such as continuous kneaders and meat choppers, and particularly favorable ones are knead-pulverizers by (continuous) extrusion from fine perforations, such as meat choppers. The fine perforation diameter of such as meat choppers being used is in the range of favorably 1 to 30 mm, more favorably 3 to 25 mm, in diameter (in cases of non-circular shapes, they are converted into circles from their areas). Incidentally, the shape of the perforations may be circular, oval, quadrangular, or triangular. However, circular perforations are favorable.

In the progress of the granulation operation and with the subsequent proceedings, the water content is evened throughout the entirety of the hydrous material or the entirety of the particulate agglomerates of the water-absorbing material. The difference in water content (water content gradient) between the surface and the center is solved.

As to the particulate agglomerates of the water-absorbing material obtained by granulating the hydrous material of the water-absorbent resin, their shape is not especially limited. Examples thereof include: a spherical shape; an oval spherical shape; a shape having rounded angles of a polygon; a rosary shape; and other shapes. The particle diameters of the particulate agglomerates of the water-absorbing material are set in the range of 1 to 20 mm, favorably 1 to 10 mm. In the case of the rosary shape, the above particle diameters correspond to its diameter.

Hereupon, there is a case where the particle diameters of the particulate agglomerates are larger than those of the hydrous material of the water-absorbent resin. Its reason is that: if the granulation apparatus is used in the step of forming the resultant hydrous material of the water-absorbent resin into the particulate agglomerates, then the hydrous material of the water-absorbent resin is kneaded in the granulation apparatus to thus newly be agglomerated, so that the particle diameters increase. Accordingly, in the present invention, the pulverization does not always refer to an operation by which the particle diameters are decreased. There may be a case where particles agglomerate together by the compression force acting when pulverizing the hydrous material of the water-absorbent resin and are then discharged in the string or rosary shape from the pulverizer. Also in this case, the resultant particulate agglomerates are larger in particle diameter than the hydrous material of the water-absorbent resin.

There is a possibility that the granulation operation may vary the water content of the hydrous material. Though depending on the water content of the produced hydrous material of the water-absorbent resin, it is favorable that the water content of the finally obtained particulate agglomerates of the water-absorbing material is in the range of 20 to 50 weight %, more favorably 25 to 45 weight %, still more favorably 30 to 40 weight %. As the water content of the obtained particulate agglomerates of the water-absorbing material becomes lower, not only does the agglomeration strength (i.e. adhesion between particles) become higher, but also the energy during the drying can more be reduced. Incidentally, the water content is determined by calculation from the added water or the water content of the water-absorbent resin or by actual measurement from the drying loss (drying loss at 180° C. in 3 hours) of the hydrous material.

[Subsequent Steps (Process 1, Process 2)]:

The particulate agglomerates of the water-absorbing material are, as they are, usable for desired uses. Furthermore, similarly to conventional water-absorbent resins, it is also possible that the particulate agglomerates of the water-absorbing material are subjected to various processing and treatment steps and thereby formed into a water-absorbing material product.

For example, it is possible that the drying step (c) is carried out, whereby the particulate agglomerates of the water-absorbing material are further dried to thereby obtain dried-state particulate agglomerates of the water-absorbing material. Specifically, it is possible that the drying is carried out in the temperature range of 80 to 250° C. for 5 minutes to 10 hours to thereby adjust the water content in the range of 0 to 10 weight %.

That is to say, the water-absorbing material according to the present invention is usable remaining in the form of the hydrous material, and generates no dust, and is excellent in the fixability to base materials (e.g. diapers, pulp). Such a water-absorbing material is not limited to being used as it is. In the present invention, favorably, it is permitted that: a drying step (c) is carried out as a subsequent step, and further, if necessary, pulverization and classification are carried out, thereby obtaining a powdery water-absorbing material. In the present invention, by carrying out the drying, the agglomeration strength can more be enhanced.

The drying method is not especially limited. Conventional driers or heating-ovens are widely used. However, favorably, if the drying is carried out at a comparatively high temperature, specifically in the range of 80 to 250° C., favorably in the range of 120 to 200° C., more favorably in the range of 150 to 190° C., then there are advantages in that the particulate agglomerates of the water-absorbing material shrink during the drying and, as a result, become a strong dried material of the particulate agglomerates of the water-absorbing material.

As to the drying duration, the drying is carried out for not less than a definite duration favorably from the viewpoint of physical properties, and the drying duration is in the range of 5 minutes to 10 hours. The solid component content, after the drying, (defined by the drying loss at 180° C. in 3 hours) is not lower than 90 weight %. Incidentally, as to the drying, the particulate agglomerates of the water-absorbing material, obtained in the present invention, may be dried either alone or along with an undried polymer gel.

The dried material of the particulate agglomerates of the water-absorbing material, obtained in the above way, is in the form of strong agglomerates as a result of the shrinkage due to the drying. However, this dried material may be adjusted in particle size by, if necessary, being pulverized and, if necessary, being classified. In the present invention, as to the water-absorbing material obtained by, if necessary, further carrying out the below-mentioned surface-crosslinking after the pulverization step (d), the weight-average particle diameter of the dried material of the particulate agglomerates of the water-absorbing material (weight-average particle diameter of the water-absorbing material) is favorably in the range of 200 to 800 μm, more favorably 300 to 600 μm, particularly favorably 350 to 450 μm. In addition, the amount of the fine powder of not larger than 150 μm in particle diameter is in the range of 0 to 20 weight %, favorably 0 to 15 weight %, more favorably 0 to 10 weight %, relative to the water-absorbing material.

In the present invention, it is favorable that a fine water-absorbent resin powder of not larger than 300 μm in particle diameter (e.g. not larger than 150 μm in weight-average particle diameter) is formed into agglomerates (having a weight-average particle diameter of 200 to 800 μm) to thus be combined. Accordingly, the dried material of the particulate agglomerates of the water-absorbing material, obtained by the above process including the above agglomerations step, is subjected to surface treatment such as surface-crosslinking treatment, whereby there can be obtained a water-absorbing material which is more excellent in the high water absorption capacity under load, the high agglomeration strength, and the high water absorption rate.

The surface-crosslinking in the surface-crosslinking step (e) refers to further crosslink-treating the surfaces or surface neighborhood portions (surface layers of several μm to tens of μm in depth) of the particles. In consideration from physical-property aspects, the amount of the surface-crosslinking agent being used is favorably in the range of 0.001 to 10 weight parts, more favorably 0.05 to 5 weight parts, per 100 weight parts of the water-absorbent resin. When the water-absorbent resin is mixed with the surface-crosslinking agent, then water and/or a hydrophilic organic solvent may be used. The amount of water being used is favorably in the range of 0.1 to 10 weight parts, more favorably 0.5 to 8 weight parts, still more favorably 1 to 5 weight parts, per 100 weight parts of the water-absorbent resin.

As such a surface-crosslinking agent, a dehydration-reactable crosslinking agent is used favorably for the agglomeration strength. In the case where the water-absorbent resin contains the carboxyl group, specific examples of the dehydration-reactable crosslinking agent include: hydroxyl-group-containing crosslinking agents (e.g. polyhydric alcohols); amino-group-containing crosslinking agents (e.g. polyamines); and cyclic crosslinking agents (e.g. alkylene carbonates, mono-, di-, or polyoxazolidinone compounds, oxetane compounds such as 3-methyl-3-oxetanemethanol) wherein the cyclic crosslinking agents produce the hydroxyl group or amino group with the progress of the ring-opening reactions of the cyclic crosslinking agents, and then this hydroxyl group or amino group makes the crosslinking reaction. It will do to carry out the crosslinking reaction by mixing the water-absorbent resin with these crosslinking agents (favorably the dehydration-reactable crosslinking agent, more favorably the polyhydric alcohols) and then heat-treating the resultant mixture in the range of 80 to 300° C. Incidentally, a surface-crosslinking agent other than the dehydration-reactable crosslinking agent may be used alone or jointly with the dehydration-reactable crosslinking agent. Examples of this other surface-crosslinking agent, which may be used, include: polyepoxy compounds such as ethylene glycol diglycidyl ether; and polyvalent metals such as Al.

As to the water-absorbing material, its water absorption capacity without load is favorably not less than 20 g/g, more favorably not less than 25 g/g, still more favorably not less than 30 g/g. In addition, as to the water-absorbing material, its water absorption capacity under a load of 4.8 kPa (0.7 psi) is favorably not less than 15 g/g, more favorably not less than 18 g/g, still more favorably not less than 20 g/g. As to the upper limits of these water absorption capacities, the higher the more favorable. However, as the case may be, high capacities involve high costs. Therefore, from the viewpoint of the cost performance, the upper limits may, for example, be about 60 g/g.

In short, the process according to the present invention for production of the water-absorbing material, most favorably, comprises the steps of: adding 20 to 50 weight parts of the aqueous liquid to 100 weight parts of the water-absorbent resin, or mixing them together, to thus obtain the sheet or reversed-fisheye-shaped hydrous material of the water-absorbent resin; and then immediately applying the mechanical compression force to this hydrous material and, at the same time, extrude-pulverizing or knead-pulverizing it, thereby making the water content gradient uniform and even all at once to thus obtain the particulate agglomerates of the water-absorbing material in the range of 1 to 20 mm in particle diameter; and then hot-air-drying them in the range of 80 to 250° C.; and then pulverizing the resultant dried material of the particulate agglomerates of the water-absorbing material so that this dried material will have a weight-average particle diameter of 200 to 800 μm.

In addition, in the present invention, the above agglomeration process is applicable also to the case where a comparatively small amount of fine powder contained in the surface-crosslinked water-absorbing material is agglomerated, and to the combination with other water-soluble compounds.

Whether before or after being dried, the water-absorbing material according to the present invention may be used as it is, or may further be combined with such as fibers, or may be modified with publicly known additives for water-absorbent resins, or may be mixed with primary particles (not yet agglomerated particles) of water-absorbent resins.

Whether before or after being dried, the water-absorbing material according to the present invention, obtained in the above way, is a molding or agglomerated product from the fine powder of the water-absorbent resin. As to uses of this water-absorbing material, it is widely usable for publicly known uses of water-absorbent resins, such as disposable diapers, sanitary napkins, water-retaining materials for agriculture and horticulture, and engineering works fields. The water-absorbing material in the form of the hydrous material is excellent in the fixability to the base materials and can be formed into excellent absorbent articles (e.g. diapers) by being mixed with such as pulp and then compressed or heated (or dried).

These and other objects and the advantages of the present invention will be more fully apparent from the following detailed disclosure.

EXPLANATION OF THE SYMBOLS

Figure 1:
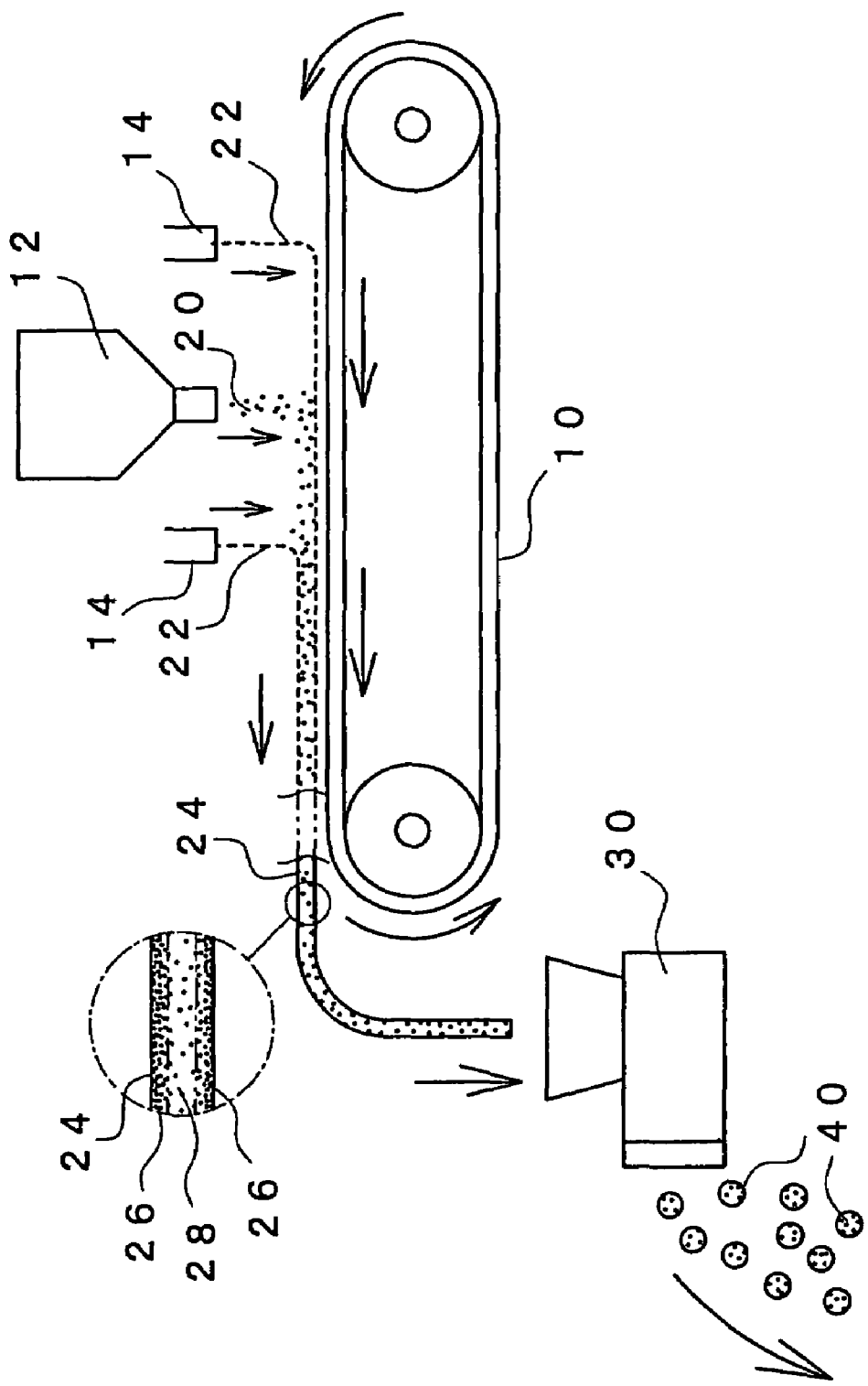
FIG. 1 is a whole constitutional view of a production apparatus, illustrating a mode for carrying out the present invention.

10: Belt conveyor
12: Fine-powder-supplying hopper
14: Nozzle for supply of aqueous liquid
20: Fine powder
22: Aqueous liquid
24: Sheet hydrous material
26: Higher-water-content layer
28: Lower-water-content layer
30: Meat chopper apparatus
40: Particulate agglomerate water-absorbing material
50: Continuous extrusion mixer
51: Driving motor
52: Casing
53: Rotary shaft
54: Aqueous-liquid-supplying inlet
55: Stirring-blade
56: Air-supplying inlet
58: Discharging outlet
60: Feeder for supply of fine powder
62: Fine powder-supplying inlet
70: Reversed-fisheye-shaped hydrous material
72: Higher-water-content layer
74: Lower-water-content layer

DETAILED DESCRIPTION OF THE INVENTION

Hereinafter, detailed descriptions are given about the present invention. However, the scope of the present invention is not bound to these descriptions. And other than the following illustrations can also be carried out in the form of appropriate modifications of the following illustrations within the scope not departing from the spirit of the present invention.

FIG. 1 schematically illustrates a whole constitution of an apparatus for production of the particulate agglomerates of the water-absorbing material via the belt-shaped hydrous material.

Figure 2:
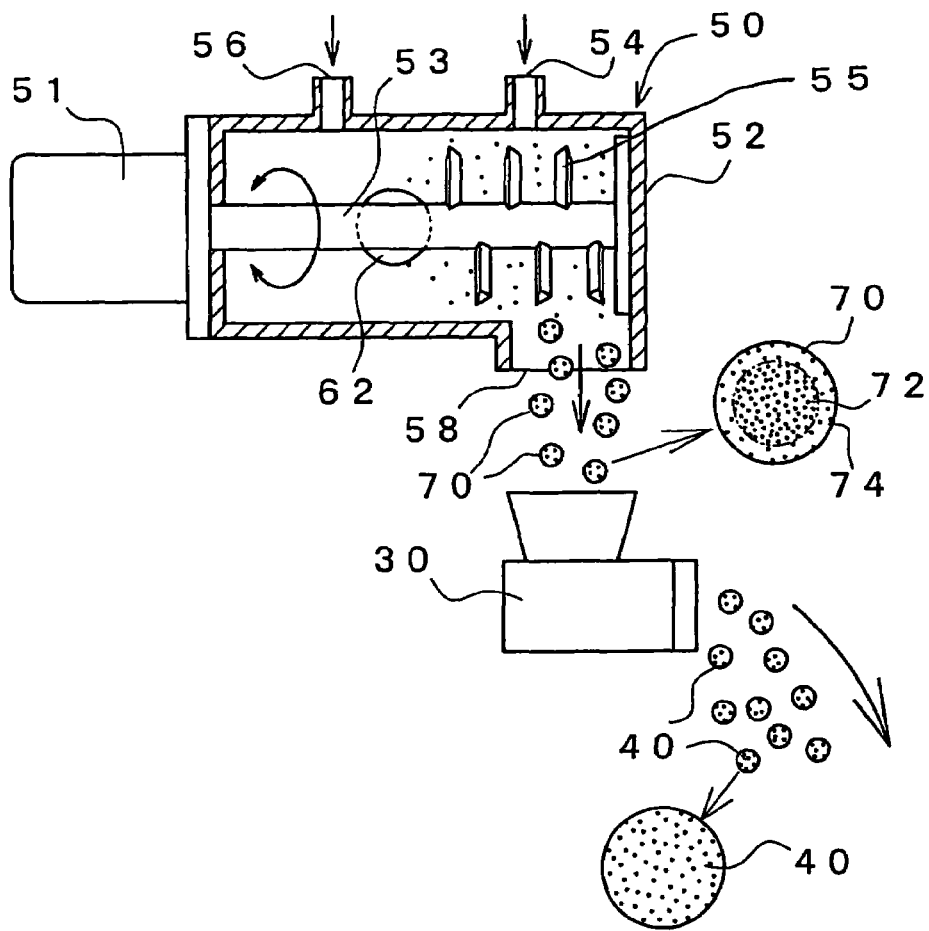
FIG. 2 is a whole constitutional view of a production apparatus, illustrating another mode for carrying out the present invention.
Figure 3:
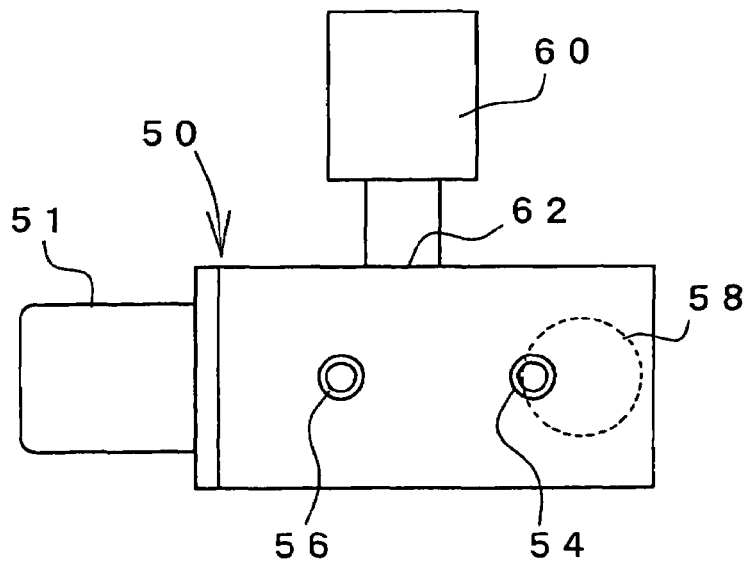
FIG. 3 is a plan view of the same production apparatus as the above.

FIGS. 2 and 3 schematically illustrate a whole constitution of an apparatus for production of the particulate agglomerates of the water-absorbing material via the reversed-fisheye-shaped hydrous material.

[Process for Production of Water-Absorbent Resin]:

The water-absorbent resin, usable in the present invention, refers to a hitherto known water-absorbent resin, for example, a hitherto publicly known crosslinked polymer which absorbs water in a large amount of essentially not smaller than 5 times, favorably in the range of 50 to 1,000 times, of the own weight in ion-exchanged water to thus form an anionic, nonionic, or cationic water-insoluble hydrogel.

This is generally a water-absorbent resin having a crosslinked structure obtained by a process including the step of polymerizing an unsaturated monomer component (favorably, an acid-group-containing (particularly, carboxyl-group-containing) unsaturated monomer), wherein the water-absorbent resin is obtained by a process including the steps of carrying out the above polymerization in a state of a monomer solution (favorably, an aqueous monomer solution), and then, if necessary, drying the resultant polymer, and then usually pulverizing the polymer before and/or after the drying step.

Examples of such a water-absorbent resin include one or two or more of such as: partially-neutralized polymers of poly(acrylic acids); hydrolyzed graft polymers of starch-acrylonitrile; graft polymers of starch-acrylic acid; saponified copolymers of vinyl acetate-acrylic acid ester; hydrolyzed copolymers of acrylonitrile or acrylamide, or crosslinked polymers of these hydrolyzed copolymers; modified polymers of carboxyl-group-containing crosslinked polyvinyl alcohols; and crosslinked copolymers of isobutylene-maleic anhydride.

As to the water-absorbent resin, one kind of water-absorbent resin or even a mixture of water-absorbent resins is used. Above all, an acid-group-containing water-absorbent resin is favorable, and one kind of carboxyl-group-containing water-absorbent resin (which is a carboxylic acid and/or its salt)) or a mixture of such resins is more favorable. Typically, there is favorably used a polymer which is obtained by a process including the step of crosslink-polymerizing a monomer including acrylic acid and/or its salt (neutralized material) as the main component, that is, a crosslinked poly(acrylic acid) (salt) polymer which contains a grafted component if necessary.

In addition, the above water-absorbent resin needs to be water-swellable and water-insoluble. The water-extractable component (water-soluble polymer) content of the water-absorbent resin as used is favorably not higher than 30 weight %, more favorably not higher than 25 weight %, still more favorably not higher than 20 weight %, particularly favorably not higher than 15 weight %.

As examples of the above acrylic acid salt, there can be cited such as: alkaline metal (e.g. sodium, potassium, lithium) salts, ammonium salts, and amine salts of acrylic acid. The above water-absorbent resin favorably contains, as its constitutional units, acrylic acid in the range of 0 to 50 mol % and an acrylic acid salt in the range of 100 to 50 mol % (wherein the total of both is not more than 100 mol %), more favorably, acrylic acid in the range of 10 to 40 mol % and an acrylic acid salt in the range of 90 to 60 mol % (wherein the total of both is not more than 100 mol %). Incidentally, the molar ratio between these acid and salt is referred to as neutralization degree. The neutralization of the water-absorbent resin for forming the above salt may be carried out in a monomer state before the polymerization, or may be carried out in a polymer state on the way of or after the polymerization, or may be carried out both in these states.

Generally, in the case where a unneutralized or low-neutralized monomer is polymerized and then the neutralization is carried out in the resultant polymer state (acid type polymerization method), then a water-absorbent resin which exhibits a high absorption capacity and has a low extractable component content may tend to be obtained, but considerable labor, facilities, and time are needed for uniform neutralization of individual particles of the water-absorbent resin (refer to JP-A-101735/1998 (Kokai)).

The monomer to obtain the water-absorbent resin as used in the present invention may further include monomers other than the above acrylic acid (salt) when the occasion demands. There is no especial limitation on the monomers other than the acrylic acid (salt). However, specific examples thereof include: anionic unsaturated monomers (e.g. methacrylic acid, maleic acid, vinylsulfonic acid, styrenesulfonic acid, 2-(meth)acrylamido-2-methylpropanesulfonic acid, 2-(meth)acryloylethanesulfonic acid, 2-(meth)acryloylpropanesulfonic acid) and their salts; nonionic hydrophilic-group-containing unsaturated monomers (e.g. acryl amide, methacryl amide, N-ethyl(meth)acrylamide, N-n-propyl (meth)acrylamide, N-isopropyl(meth)acrylamide, N,N-dimethyl(meth)acrylamide, 2-hydroxyethyl (meth)acrylate, 2-hydroxypropyl(meth)acrylate, methoxypolyethylene glycol (meth)acrylate, polyethylene glycol mono(meth)acrylate, vinylpyridine, N-vinylpyrrolidone, N-acryloylpiperidine, N-acryloylpyrrolidine, N-vinylacetamide); and cationic unsaturated monomers (e.g. N,N-dimethylaminoethyl(meth)acrylate, N,N-diethylaminoethyl(meth)acrylate, N,N-dimethylaminopropyl(meth)acrylate, N,N-dimethylaminopropyl (meth)acrylamide, and their quaternary salts). These monomers may be used either alone respectively or in appropriate combinations with each other.

In the present invention, when the monomers other than the acrylic acid (salt) are used, the ratio of these monomers other than the acrylic acid (salt) is favorably in the range of 0 to 30 mol %, more favorably 0 to 10 mol %, relative to the total of the acrylic acid and/or its salt used as the main component. If the above monomers other than the acrylic acid (salt) are used in the above ratio, then the absorption properties of the water-absorbent resin (water-absorbing material) as finally obtained are still more enhanced, and further, the water-absorbent resin (water-absorbing material) can be obtained at still lower costs.

When the above monomer is polymerized in order to obtain the water-absorbent resin as used in the present invention, it is possible to carry out bulk polymerization or precipitation polymerization. However, from the viewpoints of the performance, the facility of polymerization control, and further the absorption properties of a swollen gel, it is favorable to carry out aqueous solution polymerization or reversed-phase suspension polymerization in which the above monomer is used in the form of an aqueous solution. Incidentally, in the case where the above monomer is used in the form of an aqueous solution, the concentration of the monomer in this aqueous solution (hereinafter referred to as aqueous monomer solution) depends on the temperature of the aqueous solution or the kind of the monomer and is therefore not especially limited. However, this concentration is favorably in the range of 10 to 70 weight %, more favorably 20 to 60 weight %. In addition, when the above aqueous solution polymerization is carried out, a solvent other than water may be used jointly therewith if necessary. The kind of this solvent which is jointly used is not especially limited.

Examples of the method for the aqueous solution polymerization include: a method in which the aqueous monomer solution is polymerized while the resulting hydrogel is crushed in a twin-arm type kneader; and a method in which the aqueous monomer solution is supplied into a predetermined container or onto a moving belt to carry out the polymerization and then the resultant gel is pulverized with such as a meat chopper.

When the above polymerization is initiated, there can be used, for example, the following: radical polymerization initiators such as potassium persulfate, ammonium persulfate, sodium persulfate, t-butyl hydroperoxide, hydrogen peroxide, and 2,2'-azobis(2-amidinopropane) dihydrochloride; and photoinitiators such as 2-hydroxy-2-methyl-1-phenyl-propan-1-one.

Furthermore, a redox initiator is also available by using the above polymerization initiator jointly with a reducing agent which promotes the decomposition of the above polymerization initiator and thus combining both with each other. Examples of the above reducing agent include: (bi)sulfurous acid (salts) such as sodium sulfite and sodium hydrogensulfite; L-ascorbic acid (salts); reducible metals (salts) such as ferrous salts; and amines. However, there is no especial limitation thereto.

The amount of the above polymerization initiator as used is usually in the range of 0.001 to 2 mol %, favorably 0.01 to 0.1 mol %. In the case where the amount of the above polymerization initiator as used is smaller than 0.001 mol %, there are disadvantages in that: the amount of unreacted monomers increases, and therefore the amount of residual monomers increases in the resultant water-absorbent resin (water-absorbing material). On the other hand, in the case where the amount of the above polymerization initiator as used is larger than 2 mol %, there may be disadvantages in that the water-extractable component content in the resultant water-absorbent resin (water-absorbing material) increases.

In addition, the initiation of the polymerization reaction may be carried out by irradiating the reaction system with active energy rays such as radiations, electron rays, and ultraviolet rays. Furthermore, the above polymerization initiator may be used jointly therewith. Incidentally, the reaction temperature in the above polymerization reaction is not especially limited. However, the reaction temperature is favorably in the range of 15 to 130° C., more favorably 20 to 120° C. In addition, the reaction duration or polymerization pressure is also not especially limited, but may be set appropriately for such as the kind of the monomer or polymerization initiator and the reaction temperature.

The aforementioned water-absorbent resin may be a self-crosslinked-type water-absorbent resin obtained without any crosslinking agent, but it is preferably a water-absorbent resin obtained by copolymerization or reaction with a crosslinking agent having at least two polymerizable unsaturated groups and/or at least two reactive groups per molecule (internal-crosslinking agent for water-absorbent resins) or with a crosslinking agent which is a cyclic compound and will have at least two reactive groups per molecule by its ring-opening reaction.

Specific examples of these internal-crosslinking agents include: N,N'-methylenebis(meth)acrylamide, (poly)ethylene glycol di(meth)acrylate, (poly)propylene glycol di(meth)acrylate, trimethylolpropane tri(meth)acrylate, glycerol tri(meth)acrylate, glycerol acrylate methacrylate, ethylene-oxide-modified trimethylolpropane tri(meth)acrylate, pentaerythritol hexa(meth)acrylate, triallyl cyanurate, triallyl isocyanurate, triallyl phosphate, triallylamine, poly(meth)allyloxyalkanes, (poly)ethylene glycol diglycidyl ether, glycerol diglycidyl ether; polyhydric alcohols such as ethylene glycol, polyethylene glycol, propylene glycol, 1,3-butanediol, 1,4-butanediol, glycerol, and pentaerythritol; and ethylenediamine, ethylene carbonate, propylene carbonate, polyethylenimine, and glycidyl(meth)acrylate.

These internal-crosslinking agents may be used either alone respectively or in appropriate combinations with each other. In addition, these internal-crosslinking agents may be added to the reaction system either in a lump or divisionally. In the case where at least one or two or more kinds of internal-crosslinking agents are used, it is favorable, in consideration of such as absorption properties of the finally obtained water-absorbent resin (water-absorbing material), that a compound having at least two polymerizable unsaturated groups is essentially used during the polymerization.

The amount of the above internal-crosslinking agent as used is favorably in the range of 0.001 to 2 mol %, more favorably 0.005 to 0.5 mol %, still more favorably 0.01 to 0.2 mol %, relative to the aforementioned monomer (exclusive of the internal-crosslinking agents). In the case where the amount of the above internal-crosslinking agent as used is smaller than 0.001 mol % or larger than 2 mol %, there is a possibility that no sufficient absorption properties can be obtained.

In the case where the above internal-crosslinking agent is used to introduce a crosslinked structure into the inside of the polymer, it is enough that the above internal-crosslinking agent is added to the reaction system before, on the way of, or after the polymerization of the above monomer, or after the neutralization. However, it is favorable to carry out this addition before the polymerization.

Incidentally, when the above polymerization is carried out, to the reaction system there can be added such as: hydrophilic polymers (e.g. starch, cellulose, starch derivatives, cellulose derivatives, polyvinyl alcohol, poly(acrylic acid) (salts), and crosslinked poly(acrylic acid) (salts)) in an amount of 0 to 50 weight % (relative to the monomer); and others (e.g. various foaming agents such as (hydrogen)carbonates, carbon dioxide, azo compounds, and inert organic solvents; various surfactants; chelating agents; chain transfer agents such as hypophosphorous acid (salts); inorganic fine particles such as kaolin, talc, and silicon dioxide; polyvalent metal salts such as poly(aluminum chloride), aluminum sulfate, and magnesium sulfate) in an amount of 0 to 10 weight % (relative to the monomer).

When the above crosslinked polymer is a gel as obtained by the aqueous solution polymerization, namely, a crosslinked hydrogel polymer, then the crosslinked polymer is dried, if necessary, and usually pulverized before and/or after this drying, thus forming the water-absorbent resin. In addition, the drying is carried out in the temperature range of usually 80 to 250° C., favorably 100 to 220° C., more favorably 120 to 200° C. The drying duration depends on the surface area and water content of the polymer and the kind of the dryer and is selected for the water content to be an objective one.

The water content of the water-absorbent resin usable in the present invention (defined as the amount of water contained in the water-absorbent resin and measured by the drying loss at 180° C. in 3 hours) is not especially limited. However, from the viewpoint of physical properties of the resultant water-absorbing material, the water content is favorably such that the water-absorbent resin can be in a powder state having a water content of 0.1 to 50 weight %, more favorably 0.2 to 30 weight %, still more favorably 0.3 to 15 weight %, particularly favorably 0.5 to 10 weight %.

In addition, examples of the water-absorbent resin usable in the production process according to the present invention include particulate ones. As the particles of the water-absorbent resin, it is possible to also use undried, unpulverized, and gelled ones larger than 1,000 μm in weight-average particle diameter obtained by the polymerization reaction. However, usually, the particles of the water-absorbent resin are adjusted (regulated) to powder particle diameters according to the purpose by being dried, pulverized, and classified.

In addition, as to the particle diameters of the fine water-absorbent resin powder usable in the production process according to the present invention, there is favorably used the fine water-absorbent resin powder which has a weight-average particle diameter in the range of 150 to 10 μm.

Examples of the shape of the water-absorbent resin particles, as obtained in the above way, include a spherical shape, a pulverized shape, and an irregular shape without being especially limited. However, the irregularly pulverized shape as obtained via the pulverization step is favorably usable.

The water-absorbent resin, as obtained by the above process, usually exhibits a saturated absorption capacity of about 10 to about 100 g/g for a physiological saline solution without load, and the physical properties such as this absorption capacity are adjusted appropriately for the purpose.

[Production of Hydrous Material of Water-Absorbent Resin]:

<1. Production of Sheet Hydrous Material of Water-Absorbent Resin (Process 2)>:

As is illustrated in FIG. 1, a belt-shaped hydrous material 24 is continuously produced on the upside of an endlessly rotating belt conveyor 10. The running speed of the belt conveyor 10 is, for example, 0.56 m/min.

A nozzle 14 for supply of an aqueous liquid 22 is disposed above the upstream side of the belt conveyor 10. The aqueous liquid 22 having been supplied spraywise from the supply nozzle 14 forms a thin layer of the aqueous liquid 22 on the upside of the belt conveyor 10. The amount of the aqueous liquid 22 being supplied is, for example, 75.6 g/min.

A fine-powder-supplying hopper 12 is disposed above the downstream side, adjacent to the aqueous-liquid-supplying nozzle 14, of the belt conveyor 10. The hopper 12, for example, accommodates a fine powder 20 which includes a water-absorbent resin and has a weight-average particle diameter of not larger than 150 μm. The fine powder 20 is supplied onto the upside of the belt conveyor 10, for example, at 113.4 g/min.

Furthermore, a nozzle 14 for supply of an aqueous liquid 22 is disposed above the downstream side, adjacent to the fine-powder-supplying hopper 12, of the belt conveyor 10. The aqueous liquid 22 having been supplied spraywise from the supply nozzle 14 is supplied onto the fine water-absorbent resin powder having been layered on the upside of the belt conveyor 10. The amount of the aqueous liquid 22 being supplied is, for example, 75.6 g/min.

The supplied aqueous liquid 22 is well absorbed by the fine powder 20 in a portion near the upper end portion of the layers of the fine powder 20. However, only a small amount of the aqueous liquid 22 attains to an intermediate layer portion lying apart from the upside.

The belt-shaped hydrous material 24, as obtained in the above way, is such that: upper and lower surface layers 26 are higher-water-content layers containing a comparatively large amount of water 22; and an intermediate layer 28 is a lower-water-content layer containing only a comparatively small amount of water 22. Specifically, for example, the higher-water-content layers 26 are 1 mm in thickness and 80 weight % in water content. The lower-water-content layer 28 is 0.5 mm in thickness and 10 weight % in water content. It follows that the overall water content of the sheet hydrous material 24 is 40 weight %. However, the water content of the sheet hydrous material 24 varies continuously in the thickness directions, and there is no clear boundary line.

The sheet hydrous material 24 is removed from the belt conveyor 10 and then supplied to the step for production of a particulate agglomerate water-absorbing material 40.

The side, contacting with the belt conveyor 10, of the sheet hydrous material 24 is a higher-water-content layer 26 and has little adhesion to the belt conveyor 10. Accordingly, the operation of removing the sheet hydrous material 24 from the belt conveyor 10 can easily be carried out. The higher-water-content layers 26 exist in both surfaces of the sheet hydrous material 24 removed from the belt conveyor 10. Therefore, the sheet hydrous material 24 is prevented from adhering to the treatment apparatus or conveyance member.

<2. Production of Reversed-Fisheye-Shaped Hydrous Material of Water-Absorbent Resin (Process 1)>:

As is illustrated in FIGS. 2 and 3, a high-speed stirring type continuous extrusion mixer 50 has a casing 52 as a fixed cylinder which is, for example, horizontally fixed. A driving motor 51 is furnished to an end of the casing 52.

As is illustrated in the same Figs., a side face of the casing 52 has an opening to which there is linked a supply inlet 62 from a feeder 60 for projecting and supplying the fine water-absorbent resin powder. The casing 52 is equipped with an aqueous-liquid-supplying inlet 54 and an air-supplying inlet 56. At the right end sides of the same Figs., a discharging outlet 58 is formed.

On the other hand, inside the above casing 52, there is installed a rotary shaft 53 rotationally driven by the driving motor 51. Around this rotary shaft 53, there are furnished a plurality of stirring-blades 55 as stirring-members.

In the case where the fine water-absorbent resin powder and the aqueous liquid are mixed together by the continuous extrusion mixer 50 having the above constitution, the rotary shaft 53 is rotated, for example, at a high speed of about 100 to about 10,000 rpm, favorably about 500 to about 3,000 rpm, by the driving motor 51.

Then, in this state, the fine water-absorbent resin powder is supplied from the fine-powder-supplying inlet 62, for example, at 834 g/min. Then, the fine water-absorbent resin powder is conveyed into the continuous extrusion mixer 50 by the extrusion thrust of the spirally formed stirring-blades 55.

Next, the aqueous liquid is injected from the aqueous-liquid-supplying inlet 54, for example, supplied at 555.6 g/min. Thereby, the mixing (contacting) between the fine water-absorbent resin powder and the aqueous liquid is achieved in a moment, and then immediately the resultant mixture is automatically discharged from the discharging outlet 58, and the aqueous liquid is absorbed by the fine powder, so that the reversed-fisheye-shaped hydrous material 70 of the water-absorbent resin can be obtained.

As to the reversed-fisheye-shaped hydrous material 70 of the water-absorbent resin, its central portion 72 is in a higher-water-content swollen gel state. On the outer periphery of this higher-water-content layer 72, there is possessed a lower-water-content layer 74. This lower-water-content layer 74 is in a state where the fine water-absorbent resin powder adheres to the surface of the higher-water-content layer 72.

[Production of Particulate Agglomerates of Water-Absorbing Material (Processes 1 and 2)]:

The sheet hydrous material 24 of the water-absorbent resin and the reversed-fisheye-shaped hydrous material 70 of the water-absorbent resin are both supplied to a meat chopper apparatus 30 in order to subject them to the step for obtaining the particulate agglomerates of the water-absorbing material.

In FIG. 1, the sheet hydrous material 24 of the water-absorbent resin is continuously conveyed from the belt conveyor 10 to the meat chopper apparatus 30. However, actually, it is also possible to carry out the conveyance and supply to the meat chopper apparatus 30 in a state formed into sheet pieces by cutting the sheet hydrous material 24 (removed from the belt conveyor 10) every predetermined length. The time of from the end of the production of the sheet hydrous material 24 of the water-absorbent resin on the belt conveyor 10 till the supply of this hydrous material to the meat chopper apparatus 30 can be set in the range of 0.001 to 5 minutes.

In FIG. 2, the reversed-fisheye-shaped hydrous material 70 of the water-absorbent resin is continuously conveyed from the continuous extrusion mixer 50 to the meat chopper apparatus 30 in order to subject the hydrous material to the pulverization step. However, it is also possible to carry out the supply to the meat chopper apparatus in the form of the sheet hydrous material of the water-absorbent resin shaped by subjecting the reversed-fisheye-shaped hydrous material 70 of the water-absorbent resin (removed from the continuous extrusion mixer 50) to the compression step. The time of from the end of the production of the reversed-fisheye-shaped hydrous material 70 of the water-absorbent resin in the continuous extrusion mixer 50 till the supply of this hydrous material to the meat chopper apparatus 30 can be set in the range of 0.001 to 5 minutes.

The meat chopper apparatus 30 is equipped with such as: cutting blades rotated by such as motor; a perforated plate which is fixed and set in front of the cutting blades and has small perforations; and a mechanism of extruding the treatment material toward the cutting blades and the perforated plate. Cutting blades for further cutting the treatment material may further be equipped in front of the perforated plate. While being finely cut, the sheet hydrous material 24 of the water-absorbent resin or the reversed-fisheye-shaped hydrous material 70 of the water-absorbent resin is kneaded and then extruded from the perforated plate. In this step, the sheet hydrous material 24 of the water-absorbent resin or the reversed-fisheye-shaped hydrous material 70 of the water-absorbent resin (hereinafter abbreviated to hydrous material of the water-absorbent resin) is cut into small pieces, and further, the migration of water from the higher-water-content layer(s) 26 to the lower-water-content layer 28 proceeds due to actions such as collision and kneading between pieces of the hydrous material of the water-absorbent resin and their collision with the inner surface of the apparatus.

As to the particulate agglomerates 40 of the water-absorbing material which have been fed out of the meat chopper apparatus 30, they are in the shape of particulate agglomerates, and further, the whole of the particulate agglomerates 40 of the water-absorbing material has little inclination of the water content and has an almost constant water content. The particulate agglomerates 40 of the water-absorbing material, for example, have an average particle diameter of 1 to 20 mm and a water content of 40 weight %.

The particulate agglomerates 40 of the water-absorbing material in the shape of particulate agglomerates, which are obtained in the above way, may be used still in the hydrous state, but is usually subjected to the drying step.

In the drying step, a hot-air drying apparatus is used to dry the water-absorbing material 40, for example, at a temperature of 170° C. for 1 hour. After having been dried, the particulate agglomerates 40 of the water-absorbing material have a water content of, for example, 5 weight %.

EFFECTS AND ADVANTAGES OF THE INVENTION

In the process according to the present invention for production of the water-absorbing material, the fine powder of the water-absorbent resin is integrated and made hydrous to thus unite it into a hydrous material, thereby obtaining the hydrous material in a state where the water content of the surface side deviates from the water content range where the strong tackiness or adhesion is exhibited. Thereafter, this hydrous material is granulated to thus obtain the particulate agglomerate water-absorbing material. Therefore, when the hydrous material is produced and handled, its surface does not exhibit the strong tackiness or adhesion. Therefore, the hydrous material is easy to handle. Particularly, the operation of granulating the hydrous material is easy to carry out.

Furthermore, the overall water content of the hydrous material is set in the range where the joining force needed for the formation of the particulate agglomerates of the water-absorbing material can be exercised. Also, this overall water content of the hydrous material does not need to be made excessively high or low. Therefore, the binding force between fine powder particles is sufficiently high, so there is no hindrance to the handling of the hydrous material. It is also easy to dry and remove water contained in the particulate agglomerates of the water-absorbing material.

As a result, the water-absorbing material which is excellent in the quality performances can be produced with good productivity.

DETAILED DESCRIPTION OF THE PREFERRED EMBODIMENTS

Hereinafter, the present invention is more specifically illustrated by the following Examples of some preferred embodiments. However, the present invention is not limited to them.

The measurement and evaluation methods in the Examples and the Comparative Examples are shown below.

<Weight-Average Particle Diameter (D50)>:

As to the weight-average particle diameter (D50), the water-absorbent resin powder or the pulverized material of the dried particulate agglomerates of the water-absorbing material (or the water-absorbing material) was classified with JIS standard sieves (mesh opening sizes: 850 μm, 600 μm, 500 μm, 300 μm, 150 μm, 106 μm, 75 μm, and 45 μm). Then, the percentages R of the residues on these sieves were plotted on a logarithmic probability paper. Therefrom, a particle diameter corresponding to R=50 weight % was taken as the weight-average particle diameter (D50).

<Water Content>:

This indicates how much ratio of the water-absorbent resin powder or its hydrous material (hereinafter referred to as sample) is accounted for by water. Its relation with the solid component content is as follows.

$$\text{Water content(weight \%)}=100-\text{solid component content(weight \%)}$$

The method for measuring the water content is carried out in the following way.

An amount of 1 to 3 g (weight $W_1$) of sample is weighed out into an aluminum cup (weight $W_0$) of about 5 cm in diameter of its bottom. This sample as put in the aluminum cup is statically placed into a no-wind drier of 180° C. and then dried. The drying duration is 3 hours in the case where the sample is the water-absorbent resin powder and 16 hours in the case where the sample is the hydrous material of the water-absorbent resin. After the drying, the total weight ($W_2$) of the aluminum cup and the sample is measured. The water content is determined from the following equation.

$$\text{Water content(weight \%)}=(1-(W_2-W_0)/W_1)\times 100$$

<Solid Component Content as Set>:

This indicates the weight ratio between the water-absorbent resin powder being supplied per unit time and water being added per unit time when the present invention is continuously carried out. This corresponds to the solid component content of the finally obtained hydrous material of the water-absorbent resin. In the case where the present invention is batchwise carried out, this is the weight ratio every charge. The solid component content as set is determined from the following equation.

$$\text{Solid component content(weight \%)as set}=\text{weight of water-absorbent resin powder/(weight of water-absorbent resin powder+weight of water added)}\times 100$$

<Ratio of Fine Powder Regenerated>:

This is the ratio of a fine powder smaller than 150 μm in particle diameter (generated when the dried particulate agglomerates of the water-absorbing material are pulverized with a roll mill) to the entirety of the pulverized particles, and is determined from the following equation.

Ratio(weight %)of fine powder regenerated=150-μm-pass weight/850-μm-pass weight×100

<Water Absorption Capacity without Load (GVs30)>:

About 0.2 g of water-absorbent resin powder or water-absorbing material (having been classified in the range of 600 to 300 μm with JIS standard sieves) was uniformly placed into a nonwoven-fabric-made bag (60 mm×60 mm) and then immersed into a 0.9 weight % aqueous sodium chloride solution (physiological saline solution) of 23±2° C. After 30 minutes, the bag was pulled up and then drained of water at 250 G with a centrifugal separator for 3 minutes, and then the weight $W_1$ (g) of the bag was measured. The same procedure as the above was carried out without the water-absorbent resin, and the resultant weight $W_0$ (g) was measured. Then, the GVs30 (g/g) was calculated from these $W_1$ and $W_0$ in accordance with the following equation:

$GVs30(g/g)$=(weight $W_1(g)$–weight $W_0(g)$)/weight(g) of water-absorbent resin powder or water-absorbing material–1

<Water Absorption Capacity Under Load of 4.8 kPa (0.7 Psi) (AAP 0.7 Psi)>:

Onto a stainless metal gauze of 38 μm in mesh opening size at the bottom of a plastic supporting cylinder of 60 mm in inner diameter (wherein the metal gauze had been fused to one edge (bottom) of a cylindrical section of the supporting cylinder), there was uniformly spread 0.90 g of water-absorbent resin (or water-absorbing material), and further thereon, there was mounted a piston (cover plate), wherein the piston had an outer diameter of only a little smaller than 60 mm and made no gap with the inner wall surface of the supporting cylinder, but was not hindered from moving up and down. Then, the total weight $W_3$ (g) of the supporting cylinder, the water-absorbent resin (or water-absorbing material), and the piston was measured. On this piston, there was mounted a load as adjusted so that a load of 4.8 kPa (0.7 psi) including the piston could uniformly be applied to the water-absorbent resin (or water-absorbing material). Thereby one set of measurement apparatus had been completed. A glass filter plate of 90 mm in diameter and 5 mm in thickness was mounted inside a Petri dish of 150 mm in diameter, and then a 0.90 weight % aqueous sodium chloride solution (physiological saline solution) (of which the temperature had been adjusted to 25±2° C.) was added up to the same level as the upside of the glass filter plate, on which a piece of filter paper of 9 cm in diameter (No. 2 produced by Toyo Filter Paper Co., Ltd.) was then mounted so that its entire surface would be wetted, and further, an excess of liquid was removed.

The above one set of measurement apparatus was mounted on the above wet filter paper, thereby allowing the water-absorbent resin (or water-absorbing material) to absorb the liquid under load. If the liquid surface went down from the upside of the glass filter plate, then the liquid was added to keep the liquid surface level on a constant level. Then, 60 minutes later, the one set of measurement apparatus was removed by being lifted to re-measure the weight $W_4$ (g) excluding the load (total weight of the supporting cylinder, the swollen water-absorbent resin (or water-absorbing material), and the piston). Then, the AAP 0.7 psi (g/g) was calculated from these weights $W_3$ and $W_4$ in accordance with the following equation:

$AAP$ 0.7 psi(g/g)=(weight $W_4(g)$–weight $W_3(g)$)/weight(g)of water-absorbent resin(or water-absorbing material)

<Extractable (Water-Extractable) Component Content>:

Into a plastic receptacle of 250 ml in capacity having a lid, 184.3 g of 0.9 wt % aqueous sodium chloride solution (physiological saline solution) was weighed out. Then, 1.00 g of water-absorbent resin powder or water-absorbing material (having been classified in the range of 600 to 300 μm with JIS standard sieves) was added to this aqueous solution, and they were stirred for 16 hours, whereby extractable components were extracted from the resin. The resultant extract liquid was filtrated with a filter paper, and then 50.0 g of the resultant filtrate was weighed out and used as a measuring solution.

To begin with, only the physiological saline solution was firstly titrated with an aqueous 0:1N sodium hydroxide solution until the pH reached 10, and then the resultant solution was titrated with 0.1N hydrochloric acid until the pH reached 2.7, thus obtaining blank titration amounts ([bNaOH] ml and [bHCl] ml).

The same titration procedure was carried out also for the measuring solution, thus obtaining titration amounts ([NaOH] ml and [HCl] ml).

For example, if the water-absorbent resin comprises acrylic acid and its sodium salt in known amounts, the extractable component content of the water-absorbent resin can be calculated from the average molecular weight of the monomers and the titration amounts, as obtained from the above procedures, in accordance with the following equation. In the case of unknown amounts, the average molecular weight of the monomers is calculated from the neutralization degree as determined by the titration.

Extractable component content(weight %)=0.1×(average molecular weight)×184.3×100×([HCl]–[$b$HCl])/1,000/1.0/50.0

Neutralization degree(mol %)=(1–([NaOH]–[$b$NaOH])/([HCl]–[$b$HCl]))×100

<Specific Surface Area>:

This was determined by the "B.E.T. single-point method (Brunauer-Emmett-Teller adsorption method)." "Analyte full automatic specific surface area measurement apparatus 4-Sorb U1" (produced by Yuasa Ionics Co., Ltd.) was used as the measurement apparatus. First of all, about 5 g of water-absorbent resin powder or water-absorbing material (having beforehand been classified in the range of 600 to 300 μm with JIS standard sieves) (referred to as sample) was placed into a microcell (TYPE: QS-400) of about 13 cm$^3$ in capacity, and then the microcell containing the sample was heated to 150° C. under a nitrogen gas current to degas and dehydrate the sample sufficiently. Next, the microcell containing the sample was cooled to –200° C. under a mixed gas current including helium gas and 0.1% krypton gas to thus cause the sample to adsorb the mixed gas until equilibrium was established. Thereafter, the temperature of the microcell containing the sample was returned to room temperature to thus eliminate the mixed gas from the sample to determine the specific surface area of the water-absorbent resin powder or water-absorbing material from the amount of the krypton-mixed gas as eliminated. Incidentally, the adsorption-elimination step of the microcell containing the sample was carried out 3 times and, from their average amount, there was determined the specific surface area (m$^2$/g) of the water-absorbent resin powder or water-absorbing material.

The aforementioned apparatus for a mode for carrying out the present invention was used to produce the particulate agglomerates 40 of the water-absorbing material, and then their performances were evaluated.

As to the pulverization of the dried material of the particulate agglomerates of the water-absorbing material, the pulverization conditions were set so that the weight-average particle diameter would be in the range of 450 to 500 μm after the pulverization.

Referential Example

Production of Water-Absorbent Resin Powder (α)

In a reactor as formed by lidding a jacketed stainless twin-arm kneader of 10 liters in capacity having two sigma-type blades, there was prepared a reaction liquid by dissolving 7.40 g of polyethylene glycol diacrylate (molar-number-average degree "n" of addition polymerization of ethylene oxide=9) into 5,500 g of aqueous solution of sodium acrylate having a neutralization degree of 75 mol % (monomer concentration: 38 weight %, average molecular weight of monomers: 88.5). Next, dissolved oxygen was removed from this reaction liquid under an atmosphere of nitrogen gas for 30 minutes. Subsequently, 28.3 g of 10 weight % aqueous sodium persulfate solution and 2.1 g of 1 weight % aqueous L-ascorbic acid solution were added thereto under stirred conditions. As a result, polymerization started after about 1 minute. Then, the polymerization was carried out in the range of 20 to 95° C. while the forming gel was pulverized. Then, the resultant crosslinked hydrogel polymer (1) was taken out after 30 minutes from the start of the polymerization.

The crosslinked hydrogel polymer (1) as obtained above was in the form of divided small pieces having diameters of not larger than about 5 mm. This crosslinked hydrogel polymer (1) in the form of the divided small pieces was spread onto a metal gauze of 50 meshes (mesh opening size: 300 μm), and then hot-air-dried at 150° C. for 90 minutes, and then pulverized under a clearance of 0.4 mm with a WML type roll mill (produced by Inokuchi Giken), and then further classified with a JIS standard sieve having a mesh opening size of 850 μm, thus obtaining a water-absorbent resin powder (α) of an irregularly pulverized shape, which had a weight-average particle diameter of 430 μm and included a resin having particle diameters of smaller than 150 μm in an amount of 12.0 weight % relative to the water-absorbent resin powder and had a water content of 6.0 weight %.

Next, this water-absorbent resin powder (α) was classified into a water-absorbent resin powder (α1) (having particle diameters in the range of 850 to 150 μm) and a water-absorbent resin powder (α2) (having particle diameters of smaller than 150 μm) with a JIS standard sieve having a mesh opening size of 150 μm. The water-absorbent resin powder (α) exhibited a water absorption capacity of 35.1 (g/g) without load and had an extractable component content of 10.1 weight %.

Example 1

Via Particulate Hydrous Material of Water-Absorbent Resin (Process 1)

An amount of 500 g of the water-absorbent resin powder (α2) (having particle diameters of smaller than 150 μm), which had been obtained from Referential Example, was placed into 5-liter Lödige Mixer (M5R type, produced by Gebrüder Lödige Maschinenbau GmbH). Then, while the main shaft (plow-shaped blades) of the Lödige Mixer was revolved at a high speed of 330 rpm, 330 g of water was added thereto all at once.

Immediately after the addition of water, the stirring was stopped, and then the resultant hydrous material of the water-absorbent resin was quickly got out.

The resultant hydrous material of the water-absorbent resin was the reversed-fisheye-shaped hydrous material 70 of the water-absorbent resin of about 10 mm in average particle diameter having a lower water content in the surface and a higher water content in the central portion.

The outside and inside water contents of the resultant reversed-fisheye-shaped hydrous material 70 of the water-absorbent resin were measured.

The outside water content was 39 weight %, and the inside water content was 70 weight %. In addition, the ratios of layers having these higher water content and lower water content are as follows: relative to the entire particles, the higher-water-content layer (inside layer of the particulate hydrous material) was 81 weight %, and the lower-water-content layer (surface layer of the particulate hydrous material) was 19 weight %.

In addition, the reversed-fisheye-shaped hydrous material 70 of the water-absorbent resin, having been obtained in the same way as of the above operation in parallel with the above operation, was quickly placed into a meat chopper (12VR-400K, produced by ROYAL) having a perforated metal plate of 6.2 mm in perforation diameter. The hydrous material 70 of the water-absorbent resin, which had been placed into the meat chopper and thereby knead-pulverized, was discharged from the meat chopper while having a temperature of about 70° C. As a result, particulate agglomerates (40) of a water-absorbing material having a uniform water content (of 65 weight %) were obtained. At that time, they had a particle diameter of about 5 mm, and their temperature was so high that the cohesion of particles was prevented.

The resultant particulate agglomerates (40) of the water-absorbing material were spread onto a metal gauze of 850 μm in mesh opening size (20 meshes), and then placed into a hot-air-circulating type drier, and then dried at 170° C. for 20 minutes. Then, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (1) of an irregularly pulverized shape, which had a weight-average particle diameter of 430 μm and included a resin having particle diameters of smaller than 150 μm in an amount of 10.7 weight % relative to the water-absorbing material and had a water content of 6.0 weight %. The above water-absorbing material (1) was measured by the ratio of fine powder regenerated and by the specific surface area. The results of the above measurement are shown in Table 1.

Example 2

Via Sheet Hydrous Material of Water-Absorbent Resin Constituted by Three Layers Having Different Water Contents (Process 2)

The apparatus of FIG. 1 was used. A thin layer of water was formed on the upside of the belt conveyor of 50 cm in width (which was being run at a set speed of 0.58 n/min (10 Hz) and of which the surface had been coated with a fluororesin) by supplying thereto water at 17.79 g/min from a spray nozzle (KB80063 produced by Ikeuchi) as disposed above the belt conveyor. The water-absorbent resin powder (α2) (having particle diameters of smaller than 150 μm), which had been obtained from Referential Example, was placed into an accurate feeder (produced by Kuma Seisakusho), and the amount of the fine powder being supplied by this feeder was set at 90 g/min. Incidentally, the water-absorbent resin powder (α2)

had beforehand been heated to 70° C. This water-absorbent resin powder (α2) was supplied by the above feeder onto the belt conveyor on which the thin layer of water had been formed. Furthermore, water was re-supplied at 17.79 g/min by a spray nozzle (KB80063 produced by Ikeuchi) from above the layered water-absorbent resin powder (α2) thereto, thus obtaining an about-2-mm-thick sheet hydrous material (24) of the water-absorbent resin, of which the outside surface and back both had higher water contents, and of which the central portion had a lower water content.

The resultant sheet hydrous material (24) of the water-absorbent resin was quickly placed into a meat chopper (TB32 type, produced by Hiraga) having a perforated metal plate of 6.2 mm in perforation diameter.

The hydrous material (24) of the water-absorbent resin, which had been placed into the meat chopper and thereby knead-pulverized, was discharged from the meat chopper while having a temperature of about 70° C. As a result, particulate agglomerates (40) of a water-absorbing material having a uniform water content were obtained. At that time, they had a particle diameter of about 5 mm, and their temperature was so high that the cohesion of particles was prevented.

The resultant particulate agglomerates (40) of the water-absorbing material were spread onto a metal gauze of 850 μm in mesh opening size (20 meshes), and then placed into a hot-air-circulating type drier, and then dried at 170° C. for 20 minutes. Then, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (2) of an irregularly pulverized shape, which had a weight-average particle diameter of 400 μm and included a resin having particle diameters of smaller than 150 μm in an amount of 12.5 weight % relative to the water-absorbing material and had a water content of 6.8 weight %. The above water-absorbing material (2) was measured by the ratio of fine powder regenerated and by the specific surface area. The results of the above measurement are shown in Table 1.

Example 3

Via Particulate Hydrous Material of Water-Absorbent Resin (Process 1)

The apparatus of FIGS. 2 and 3 was used. The water-absorbent resin powder (α2) (having particle diameters of smaller than 150 μm) was supplied at 835 g/min by an accurate feeder (produced by Kuma Seisakusho) from the fine-powder-supplying inlet of the continuous extrusion mixer (of which the number of revolutions of the main shaft had been set at 1,500 rpm), and the aqueous liquid was supplied at 450 g/min from the aqueous-liquid-supplying inlet, and further, compressed air was supplied at 150 liters/min from the air-supplying inlet, thus obtaining a reversed-fisheye-shaped hydrous material 70 of the water-absorbent resin, of which the surface had a lower water content, and of which the central portion had a higher water content.

The resultant reversed-fisheye-shaped hydrous material 70 of the water-absorbent resin was quickly placed into a meat chopper (TB32 type, produced by Hiraga) having a perforated metal plate of 9.5 mm in perforation diameter.

The hydrous material 70 of the water-absorbent resin, which had been placed into the meat chopper and thereby knead-pulverized, was discharged from the meat chopper while having a temperature of about 70° C. As a result, particulate agglomerates (40) of a water-absorbing material having a uniform water content were obtained. At that time, they had a particle diameter of about 5 mm, and their temperature was so high that the cohesion of particles was prevented.

The resultant particulate agglomerates (40) of the water-absorbing material were spread onto a metal gauze of 850 μm in mesh opening size (20 meshes), and then placed into a hot-air-circulating type drier, and then dried at 170° C. for 20 minutes. Then, the resultant dried material of the particulate agglomerates of the water-absorbing material was pulverized under a clearance of 0.35 mm with a WML type roll mill (produced by Inokuchi Giken), and then further classified with a JIS standard sieve having a mesh opening size of 850 μm, thus obtaining a water-absorbing material (3) of an irregularly pulverized shape, which had a weight-average particle diameter of 435 μm and included a resin having particle diameters of smaller than 150 μm in an amount of 15.0 weight % relative to the water-absorbing material and had a water content of 7.0 weight %. The above water-absorbing material (3) was measured by the ratio of fine powder regenerated and by the specific surface area. The results of the above measurement are shown in Table 1.

Example 4

Via Particulate Hydrous Material of Water-Absorbent Resin (Process 1)

A reversed-fisheye-shaped hydrous material 70 of the water-absorbent resin, having come apart more than that of Example 3, was obtained by carrying out the same operation as of Example 3 except that the amount of water being added was changed to 290 g/min. Still thereafter, the same operation as of Example 3, including the classification with the JIS standard sieve having a mesh opening size of 850 μm, was carried out, thus obtaining a water-absorbing material (4) of an irregularly pulverized shape, which had a weight-average particle diameter of 456 μm and included a resin having particle diameters of smaller than 150 μm in an amount of 13.0 weight % relative to the water-absorbing material and had a water content of 7.0 weight %. The above water-absorbing material (4) was measured by the ratio of fine powder regenerated and by the specific surface area. The results of the above measurement are shown in Table 1.

Example 5

Via Particulate Hydrous Material of Water-Absorbent Resin (Process 1)

A reversed-fisheye-shaped hydrous material 70 of the water-absorbent resin was obtained by carrying out the same operation as of Example 3 except that the amount of water being added was changed to 210 g/min. Still thereafter, the same operation as of Example 3, including the classification with the JIS standard sieve having a mesh opening size of 850 μm, was carried out, thus obtaining a water-absorbing material (5) of an irregularly pulverized shape, which had a weight-average particle diameter of 477 μm and included a resin having particle diameters of smaller than 150 μm in an amount of 14.2 weight % relative to the water-absorbing material and had a water content of 7.0 weight %. The above water-absorbing material (5) was measured by the ratio of fine powder regenerated. The results of the above measurement are shown in Table 1.

Example 6

Via Particulate Hydrous Material of Water-Absorbent Resin (Process 1)

A reversed-fisheye-shaped hydrous material 70 of the water-absorbent resin was obtained by carrying out the same operation as of Example 3 except that the amount of water being added was changed to 1,250 g/min. Still thereafter, the same operation as of Example 3, including the classification with the JIS standard sieve having a mesh opening size of 850 μm, was carried out, thus obtaining a water-absorbing material (6) of an irregularly pulverized shape, which had a weight-average particle diameter of 464 μm and included a resin having particle diameters of smaller than 150 μm in an amount of 11.3 weight % relative to the water-absorbing material and had a water content of 7.0 weight %. The above water-absorbing material (6) was measured by the ratio of fine powder regenerated. The results of the above measurement are shown in Table 1.

Example 7

Involving Surface-Crosslinking Treatment

Surfaces of particles of the water-absorbing material (2), which had been obtained from Example 2, was crosslink-treated as follows. An amount of 100 g of the water-absorbing material (2), which had been obtained from Example 2, was placed into 5-liter Lödige Mixer (M5R type, produced by Gebrüder Lödige Maschinenbau GmbH). Then, while the main shaft (plow-shaped blades) of the Lödige Mixer was revolved at a high speed of 330 rpm, a treating agent having a composition of 1,4-butanediol/propylene glycol/water=0.32/0.5/2.73 weight % (relative to the water-absorbing material) was spraywise added to the water-absorbing material to mix them together for 1 minute.

Immediately after the mixing, the water-absorbing material to which the treating agent had been added was placed into a mortar mixer (which was immersed in an oil bath having been heated to 197° C.) and then heat-treated for 40 minutes.

Immediately thereafter, the water-absorbing material was got out and then classified with a JIS standard sieve having a mesh opening size of 850 μm, thus obtaining a surface-crosslinked water-absorbing material.

This surface-crosslinked water-absorbing material was measured by the water absorption capacity without load (GVs30) and the water absorption capacity under the load of 4.8 kPa (0.7 psi) (AAP 0.7 psi). As a result, GVs30=20.5 (g/g), AAP 0.7 psi=19.8 (g/g).

Comparative Example 1

Without Pulverization by Mechanical Compression Force

An amount of 2,000 g of the water-absorbent resin powder (α2) (having particle diameters of smaller than 150 μm), which had been obtained from Referential Example, was placed into 20-liter Lödige Mixer (M20 type, produced by Gebrüder Lödige Maschinenbau GmbH, with a jacket heated to about 100° C. by steam). Then, while the main shaft (plow-shaped blades) of the Lödige Mixer and its chopper were revolved at high speeds of 230 rpm and 6,000 rpm respectively, 1,200 g of water having been heated to 90° C. was added thereto all at once.

The water-absorbent resin powder (α2) and water immediately became mixed together, so that the entire contents became a gelled hydrous material of the water-absorbent resin having particle diameters in the range of about 3 to about 10 mm. However, this hydrous material of the water-absorbent resin had so high adhesive strength that the main shaft stopped due to the overload after 2 minutes from the start of the mixing. As to the resultant hydrous material of the water-absorbent resin, its particulate agglomerates cohered to form large agglomerates. They were forcedly disintegrated, and then spread onto a metal gauze of 850 μm in mesh opening size (20 meshes), and then placed into a hot-air-circulating type drier, and then dried at 170° C. for 20 minutes.

Next, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (7) of an irregularly pulverized shape, which had a weight-average particle diameter of 368 μm and included a resin having particle diameters of smaller than 150 μm in an amount of 21.7 weight % relative to the water-absorbing material and had a water content of 4.7 weight %. The above water-absorbing material (7) was measured by the ratio of fine powder regenerated and by the specific surface area. The results of the above measurement are shown in Table 1.

Comparative Example 2

Without Pulverization by Mechanical Compression Force

An amount of 300 g of the water-absorbent resin powder (α2) (having particle diameters of smaller than 150 μm), which had been obtained from Referential Example, was placed into a 5-liter mortar mixer (produced by Nishi Nihon Shikenki Seisakusho K. K., with the 5-liter container heat-retained by a bath of 80° C.). Then, while the stirring-blades of the mortar mixer was revolved at a high speed by 60 Hz/100 V, 330 g of water having been heated to 90° C. was added thereto all at once.

The water-absorbent resin powder (α2) and water became mixed together within 10 seconds, so that the entire contents became a gelled hydrous material of the water-absorbent resin having particle diameters in the range of about 3 to about 10 mm. In the mortar mixer, this hydrous material of the water-absorbent resin was in a state having come so apart as not to appear to be kneaded due to the mixing by the stirring-blades. The high-speed stirring in the mortar mixer was carried out for 1 minute. Thereafter, the resultant hydrous material of the water-absorbent resin was got out, and then spread onto a metal gauze of 850 μm in mesh opening size (20 meshes), and then placed into a hot-air-circulating type drier, and then dried at 170° C. for 20 minutes.

Next, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (8) of an irregularly pulverized shape, which had a weight-average particle diameter of 420 μm and included a resin having particle diameters of smaller than 150 μm in an amount of 20.0 weight % relative to the water-absorbing material and had a water content of 5.0 weight %. The above water-absorbing material (8) was mea-

Comparative Example 3

Via Hydrous Material of Water-Absorbent Resin of 15 Weight % in Water Content

The water-absorbent resin powder (β2) (having particle diameters of smaller than 150 μm), which had been obtained from Referential Example, was used to carry out the same operation as of Example 3 except that the amount of water being added was changed to 148 g/min. The resultant reversed-fisheye-shaped hydrous material 70 of the water-absorbent resin, having been discharged from the continuous extrusion mixer, was quickly placed into a meat chopper (TB32 type, produced by Hiraga) having a perforated metal plate of 9.5 mm in perforation diameter. As a result, the meat chopper stopped due to the overload after 2 minutes from the start of the knead-pulverizing. Inside the meat chopper, the hydrous material of the water-absorbent resin became strongly solid and adhered to the inner surface, and the inner blades were broken.

Comparative Example 4

Without Pulverization by Mechanical Compression Force

The water-absorbent resin powder (α2) (having particle diameters of smaller than 150 μm), which had been obtained from Referential Example, was used to carry out the same operation as of Example 3. However, immediately, without being passed through the meat chopper, after having been discharged from the continuous extrusion mixer, the resultant hydrous material 70 of the water-absorbent resin was spread onto a metal gauze of 850 μm in mesh opening size (20 meshes), and then placed into a hot-air-circulating type drier, and then dried at 170° C. for 20 minutes. Then, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (9) of an irregularly pulverized shape, which had a weight-average particle diameter of 332 μm and included a resin having particle diameters of smaller than 150 μm in an amount of 19.4 weight % relative to the water-absorbing material and had a water content of 2.3 weight %. The above water-absorbing material (9) was measured by the ratio of fine powder regenerated. The results of the above measurement are shown in Table 1.

Comparative Example 5

Without Pulverization by Mechanical Compression Force

The water-absorbent resin powder (α2) (having particle diameters of smaller than 150 μm), which had been obtained from Referential Example, was used to carry out the same operation as of Example 3 except that the amount of water being added was changed to 358 g/min. However, immediately, without being passed through the meat chopper, after having been discharged from the continuous extrusion mixer, the resultant reversed-fisheye-shaped hydrous material 70 of the water-absorbent resin was spread onto a metal gauze of 850 μm in mesh opening size (20 meshes), and then placed into a hot-air-circulating type drier, and then dried at 170° C. for 20 minutes. Then, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (10) of an irregularly pulverized shape, which had a weight-average particle diameter of 306 μm and included a resin having particle diameters of smaller than 150 μm in an amount of 24.4 weight % relative to the water-absorbing material and had a water content of 2.8 weight %. The above water-absorbing material (10) was measured by the ratio of fine powder regenerated. The results of the above measurement are shown in Table 1.

Comparative Example 6

Via Sheet Hydrous Material of Water-Absorbent Resin Constituted by One Layer Having Uniform Water Content The water-absorbent resin powder (α2) (having particle diameters of smaller than 150 μm), which had been obtained from Referential Example, was used to carry out the same operation as of Example 2. However, the resultant sheet hydrous material 24 of the water-absorbent resin was left remaining sheet for 20 minutes, whereby the water content inside this sheet hydrous material of the water-absorbent resin was made uniform. The resultant sheet hydrous material of the water-absorbent resin, of which the water content had become uniform, was a strongly cohered agglomerate impossible to pulverize with the meat chopper.

Comparative Example 7

Via Hydrous Material of Water-Absorbent Resin of 65 Weight % in Water Content

The water-absorbent resin powder (α2) (having particle diameters of smaller than 150 μm), which had been obtained from Referential Example, was used to carry out the same operation as of Example 3 except that the amount of water being added was changed to 1,550 g/min.

The resultant particulate agglomerates (40) of the water-absorbing material were spread onto a metal gauze of 850 μm in mesh opening size (20 meshes), and then placed into a hot-air-circulating type drier, and then dried at 170° C. for 20 minutes. However, the particulate agglomerates of the water-absorbing material did not become sufficiently dried. Therefore, they needed to further be dried at 170° C. for 20 minutes. Then, the resultant dried material of the particulate agglomerates of the water-absorbing material was pulverized under a clearance of 0.4 mm with a WML type roll mill (produced by Inokuchi Giken), and then further classified with a JIS standard sieve having a mesh opening size of 850 μm, thus obtaining a water-absorbing material (11) of an irregularly pulverized shape, which had a weight-average particle diameter of 483 μm and included a resin having particle diameters of smaller than 150 μm in an amount of 12.1 weight % relative to the water-absorbing material and had a water content of 5.0 weight %. The above water-absorbing material (11) was measured by the ratio of fine powder regenerated. The results of the above measurement are shown in Table 1.

TABLE 1

<Results of performance measurement>

| | | Solid component content as set weight % | Ratio of fine powder regenerated weight % | Drying temperature °C. | Drying duration minutes | D50 μm | Variation of D50 (from Referential Example) | Specific surface area m²/g |
|---|---|---|---|---|---|---|---|---|
| Referential Example | Water-absorbent resin (α) | — | 12.0 | 150 | 90 | 430 | — | 0.016 |
| Example 1 | Water-absorbing material (1) | 65.0 | 10.7 | 170 | 20 | 430 | 0 | 0.042 |
| Example 2 | Water-absorbing material (2) | 65.0 | 12.5 | 170 | 20 | 400 | −30 | 0.041 |
| Example 3 | Water-absorbing material (3) | 65.0 | 15.0 | 170 | 20 | 435 | 5 | 0.038 |
| Example 4 | Water-absorbing material (4) | 74.0 | 13.0 | 170 | 20 | 456 | 26 | 0.052 |
| Example 5 | Water-absorbing material (5) | 80.0 | 14.2 | 170 | 20 | 477 | 47 | — |
| Example 6 | Water-absorbing material (6) | 40.0 | 11.3 | 170 | 20 | 464 | 34 | — |
| Comparative Example 1 | Water-absorbing material (7) | 62.5 | 21.7 | 170 | 20 | 368 | −62 | 0.036 |
| Comparative Example 2 | Water-absorbing material (8) | 47.6 | 20.0 | 170 | 20 | 420 | −10 | 0.038 |
| Comparative Example 3 | — | 85.0 | — | — | Disintegration by M/C was impossible. | — | — | — |
| Comparative Example 4 | Water-absorbing material (9) | 65.0 | 19.4 | 170 | 20 | 332 | −98 | — |
| Comparative Example 5 | Water-absorbing material (10) | 70.0 | 24.4 | 170 | 20 | 306 | −124 | — |
| Comparative Example 6 | — | 65.0 | — | — | Disintegration by M/C was impossible. | — | — | — |
| Comparative Example 7 | Water-absorbing material (11) | 35.0 | 12.1 | 170 | 40 | 483 | 53 | — |

The results, as shown in Table 1 above, are explained below.

Comparative Example 1 is comparative with Example 1 and different therefrom in that the hydrous material of the water-absorbent resin was dried and pulverized without being knead-pulverized with the meat chopper. From comparison as to the ratio of fine powder regenerated, it can be understood that: in Example 1, the weight-average particle diameter is also almost the objective value (430 μm), and further, the ratio of fine powder regenerated is ½ of that of Comparative Example 1, so the regeneration of the fine powder is prevented.

Comparative Example 2 is such that the solid component content as set is near that of Example 6, and that, similarly to Comparative Example 1, the knead-pulverization of the hydrous material of the water-absorbent resin with the meat chopper is omitted. As to the ratio of fine powder regenerated, Example 6 is lower and therefore more excellent.

Comparative Example 3 is comparative with Example 5 and a case as carried out under conditions where the solid component content as set is a high value of 85 weight %. The hydrous material of the water-absorbent resin unfavorably became strongly solid agglomerates inside the meat chopper, so that the meat chopper stopped due to the overload.

Comparative Example 4 is comparative with Example 3 and is such that the solid component content as set is the same, but that the knead-pulverization of the hydrous material of the water-absorbent resin with the meat chopper is omitted. When compared with this Comparative Example, Example 3 is not only more excellent as to the ratio of fine powder regenerated, but also nearer to Referential Example as to the weight-average particle diameter (D50) after the pulverization (smaller as to the variation of the D50), and therefore can be said to be stronger as to the agglomeration strength.

Comparative Example 5 is comparative with Example 4 and is such that the solid component content as set is the same, but that the knead-pulverization of the hydrous material of the water-absorbent resin with the meat chopper is omitted. Also in comparison between these Comparative Example 5 and Example 4, Example 4 is not only more excellent as to the ratio of fine powder regenerated, but also nearer to Referential Example as to the weight-average particle diameter (D50) after the pulverization (smaller as to the variation of the D50), and therefore can be said to be stronger as to the agglomeration strength.

Comparative Example 6 is comparative with Example 2 and is such that the knead-pulverization of the sheet hydrous material of the water-absorbent resin with the meat chopper was attempted after this hydrous material of the water-absorbent resin has been left at room temperature in order to make its water content gradient zero. However, the hydrous material of the water-absorbent resin, of which the water content gradient had been made zero, was a strongly cohered agglomerate. Therefore, the meat chopper stopped due to the overload when the knead-pulverization of the hydrous material of the water-absorbent resin with the meat chopper was attempted. From this result, it can be said to be important that the hydrous material of the water-absorbent resin is knead-pulverized immediately after having been produced.

Comparative Example 7 is such that the solid component content as set was made lower than that of Example 6. The particulate agglomerates of the water-absorbing material, having been knead-pulverized with the meat chopper, had such a high water content (65 weight %) that they could not sufficiently be dried under conventional drying conditions (at 170° C. for 20 minutes). Therefore, if the above particulate agglomerates of the water-absorbing material were left as they were, then their pulverization was impossible. Thus, there was needed the further drying duration of 20 minutes, in other words, the drying duration of as much as 2 times. Long-duration drying is unfavorable in point of causing the thermal deterioration.

Example 8

An amount of 10 g of the particulate agglomerates (40) of the water-absorbing material, which had been obtained from Example 1, was mixed with 15 g of pulp without being dried. After the mixing, the resultant mixture was molded into a sheet shape and then pressed (compressed under 2 kg/cm² for 1 minute), whereby the particulate agglomerates of the water-absorbing material were easily fixed to the pulp.

Comparative Example 8

In the same way as of Example 8, the fine powder, which had been obtained from Referential Example, was mixed with the pulp and then molded into a sheet shape. However, the fine powder tended to fall off from the resultant sheet pulp. Thus, the fine powder could not be fixed to the pulp.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A process for production of a water-absorbing material, which is a process for production of a water-absorbing material from a fine powder of a water-absorbent resin wherein the water-absorbing material is a particulate water-absorbing material having particle diameters larger than the fine powder, with the process comprising:
   a step (a) of adding an aqueous liquid to the fine powder of the water-absorbent resin so that the overall average water content will be in the range of 20 to 60 weight %, whereby particles of the fine powder are agglomerated to thus obtain a hydrous material of the water-absorbent resin having at least two portions with different water contents; and
   a step (b) of applying a mechanical compression force to the hydrous material and, at the same time, pulverizing it, thereby obtaining particulate agglomerates of the water-absorbing material.

2. A process for production of a water-absorbing material, which is a process for production of a water-absorbing material from a fine powder of a water-absorbent resin wherein the water-absorbing material is a particulate water-absorbing material having particle diameters larger than the fine powder, with the process comprising:
   a step (a) of adding an aqueous liquid to the fine powder of the water-absorbent resin so that the overall average water content will be in the range of 20 to 60 weight %, whereby particles of the fine powder are agglomerated to thus obtain a sheet hydrous material of the water-absorbent resin constituted by at least two layers having different water contents; and
   a step (b) of applying a mechanical compression force to the hydrous material and, at the same time, pulverizing it, thereby obtaining particulate agglomerates of the water-absorbing material.

3. A process for production of a water-absorbing material according to claim 1, wherein the hydrous material of the water-absorbent resin is a hydrous material of the water-absorbent resin which includes at least two layers, namely, a higher-water-content layer having a water content of 50 to 99 weight % and a lower-water-content layer having a water content of 1 to less than 50 weight %, and has a water content gradient in the hydrous material.

4. A process for production of a water-absorbing material according to claim 3, wherein, in the hydrous material of the water-absorbent resin having the water content gradient, the higher-water-content portion accounts for 2 to 98 weight % of the entirety, and the lower-water-content portion accounts for 98 to 2 weight % of the entirety.

5. A process for production of a water-absorbing material according to claim 1, wherein, in the step (a), the fine powder of the water-absorbent resin is brought into contact with the aqueous liquid under stirring to thereby obtain, as the hydrous material, a particulate hydrous material of the water-absorbent resin constituted by a lower-water-content surface layer and a higher-water-content central layer.

6. A process for production of a water-absorbing material according to claim 2, wherein, in the step (a), the fine powder of the water-absorbent resin is accumulated in layers to thereby obtain, as the hydrous material, a sheet hydrous material of the water-absorbent resin constituted by a lower-water-content central layer and higher-water-content surface layers on both sides of the lower-water-content layer.

7. A process for production of a water-absorbing material according to claim 1, wherein the particulate agglomerates of the water-absorbing material are obtained by applying the mechanical compression force to the hydrous material and, at the same time, pulverizing it within 0.001 to 5 minutes after the fine powder of the water-absorbent resin and the aqueous liquid have come into contact with each other.

8. A process for production of a water-absorbing material according to claim 1, wherein the hydrous material of the water-absorbent resin has a temperature of 40 to 100° C. before being pulverized after the aqueous liquid has been added thereto.

9. A process for production of a water-absorbing material according to claim 1, which further comprises a drying step (c) of further drying the particulate agglomerates of the water-absorbing material after the step (b).

10. A process for production of a water-absorbing material according to claim 9, which further comprises a pulverization step (d) of further pulverizing the particulate agglomerates of the water-absorbing material after the drying step (c), thereby obtaining a water-absorbing material including a fine powder of not larger than 150 μm in particle diameter in an amount of 0 to 20 weight % relative to the water-absorbing material.

11. A process for production of a water-absorbing material according to claim 10, which further comprises a surface-crosslinking step (e) of further crosslink-treating the surfaces or surface neighborhood portions of particles of the water-absorbing material after the pulverization step (d).

12. A process for production of a water-absorbing material according to claim 11, wherein the water-absorbing material having been surface-crosslinked in the surface-crosslinking step (e) exhibits a water absorption capacity of not less than 20 g/g under a load of 4.8 kPa (0.7 psi).

13. A process for production of a water-absorbing material according to claim 2, wherein the hydrous material of the water-absorbent resin is a hydrous material of the water-absorbent resin which includes at least two layers, namely, a higher-water-content layer having a water content of 50 to 99 weight % and a lower-water-content layer having a water content of 1 to less than 50 weight %, and has a water content gradient in the hydrous material.

14. A process for production of a water-absorbing material according to claim 2, wherein the particulate agglomerates of the water-absorbing material are obtained by applying the mechanical compression force to the hydrous material and, at the same time, pulverizing it within 0.001 to 5 minutes after the fine powder of the water-absorbent resin and the aqueous liquid have come into contact with each other.

15. A process for production of a water-absorbing material according to claim 2, wherein the hydrous material of the water-absorbent resin has a temperature of 40 to 100° C. before being pulverized after the aqueous liquid has been added thereto.

16. A process for production of a water-absorbing material according to claim 2, which further comprises a drying step (c) of further drying the particulate agglomerates of the water-absorbing material after the step (b).

17. A process for production of a water-absorbing material according to claim 16, which further comprises a pulverization step (d) of further pulverizing the particulate agglomerates of the water-absorbing material after the drying step (c), thereby obtaining a water-absorbing material including a fine powder of not larger than 150 μm in particle diameter in an amount of 0 to 20 weight % relative to the water-absorbing material.

18. A process for production of a water-absorbing material according to claim 17, which further comprises a surface-crosslinking step (e) of further crosslink-treating the surfaces or surface neighborhood portions of particles of the water-absorbing material after the pulverization step (d).

19. A process for production of a water-absorbing material according to claim 18, wherein the water-absorbing material having been surface-crosslinked in the surface-crosslinking step (e) exhibits a water absorption capacity of not less than 20 g/g under a load of 4.8 kPa (0.7 psi).

20. The process for production of a water-absorbing material according to claim 1, wherein the hydrous material is selected from the group consisting of a particulate hydrous material and sheet hydrous material.

21. The process for production of a water-absorbing material according to claim 1, wherein the hydrous material is a particulate.

22. The process for production of a water-absorbing material according to claim 1, wherein the hydrous material is a sheet having at least two layers with different water content.

\* \* \* \* \*